United States Patent
Mori

(10) Patent No.: US 7,310,248 B2
(45) Date of Patent: Dec. 18, 2007

(54) CONTROL METHOD OF SWITCHING A POWER SUPPLY CIRCUIT

(75) Inventor: Yoshihiro Mori, Kadoma (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 11/646,318

(22) Filed: Dec. 28, 2006

(65) Prior Publication Data

US 2007/0103944 A1    May 10, 2007

Related U.S. Application Data

(63) Continuation of application No. 11/134,462, filed on May 23, 2005, now Pat. No. 7,161,815.

(30) Foreign Application Priority Data

| May 24, 2004 | (JP) | ............................ 2004-152638 |
| Oct. 4, 2004 | (JP) | ............................ 2004-290856 |

(51) Int. Cl.
*H02M 3/335* (2006.01)
(52) U.S. Cl. ................. 363/21.16; 363/21.18
(58) Field of Classification Search ............ 363/21.12, 363/21.16, 21.17, 21.18
See application file for complete search history.

(56) References Cited

U.S. PATENT DOCUMENTS

| 5,880,942 | A | 3/1999 | Leu ............................ 363/49 |
| 5,982,640 | A | 11/1999 | Naveed et al. ........... 363/21.15 |
| 6,515,876 | B2 | 2/2003 | Koike et al. .............. 363/21.16 |
| 6,529,391 | B2 | 3/2003 | Yoshinaga et al. ....... 363/21.15 |
| 6,532,159 | B2 | 3/2003 | Nishida et al. .......... 363/21.16 |
| 6,922,345 | B2 | 7/2005 | Nishida et al. .......... 363/21.16 |
| 6,963,496 | B2 | 11/2005 | Bimbaud ................. 363/21.16 |

FOREIGN PATENT DOCUMENTS

| JP | 06149396 | 5/1994 |
| JP | 7-3292 | 1/1995 |
| JP | 2002-300777 | 10/2002 |

*Primary Examiner*—Bao Q. Vu
(74) *Attorney, Agent, or Firm*—Steptoe & Johnson LLP

(57) ABSTRACT

A switching power supply for achieving a constant current drooping characteristic of sufficient accuracy with low cost and the minimum number of components. In the switching power supply, a secondary duty limiter circuit outputs a clock signal from the time a switching element is turned off until the time the on duty of secondary current, which starts flowing to a secondary winding of a transformer, is fixed at a predetermined value. A clock signal selector circuit selects and outputs the clock signal when a load increases and the on duty of the secondary current reaches the predetermined value. Consequently, when the load increases, a direct current output voltage decreases and an output characteristic becomes a constant current drooping characteristic. At this point, when the voltage of an element current detection signal reaches an overcurrent protection reference voltage, a drain current control circuit outputs a turn-off signal for determining the turn-off of the switching element, therefore the peak current of the secondary current is kept at a fixed value.

1 Claim, 13 Drawing Sheets

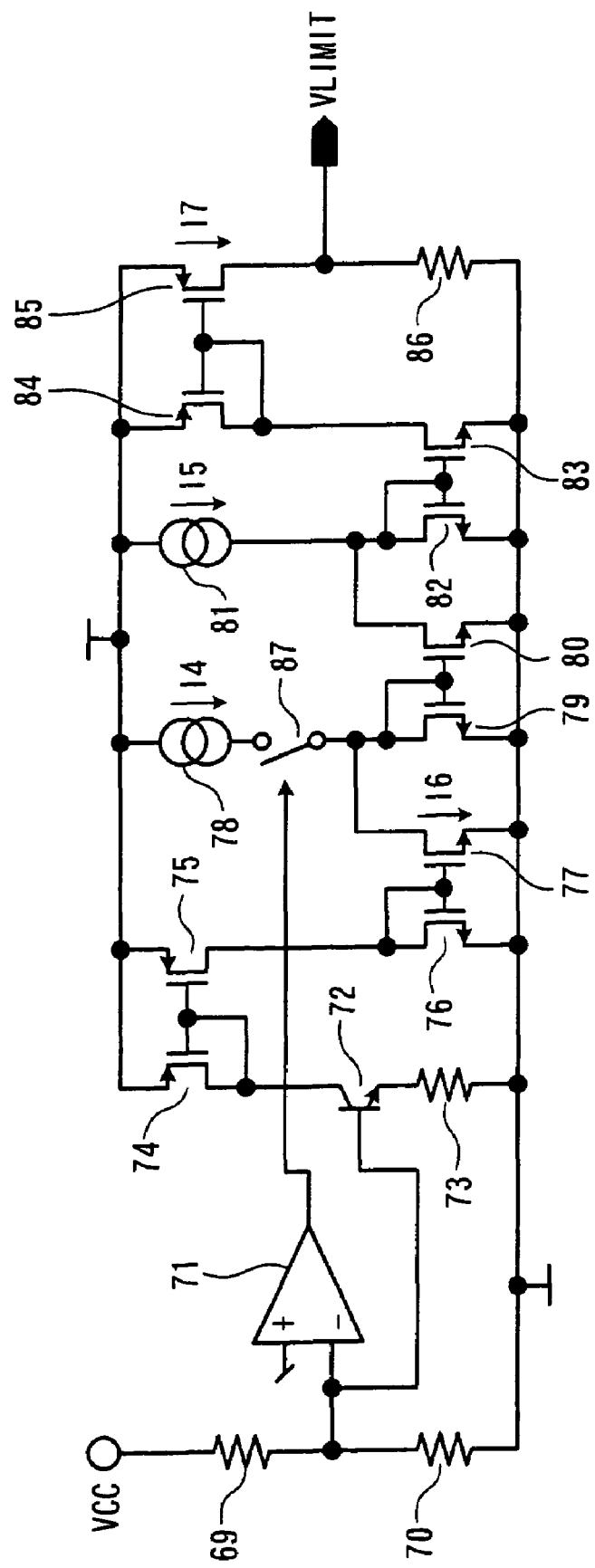
F I G. 6

F I G. 7

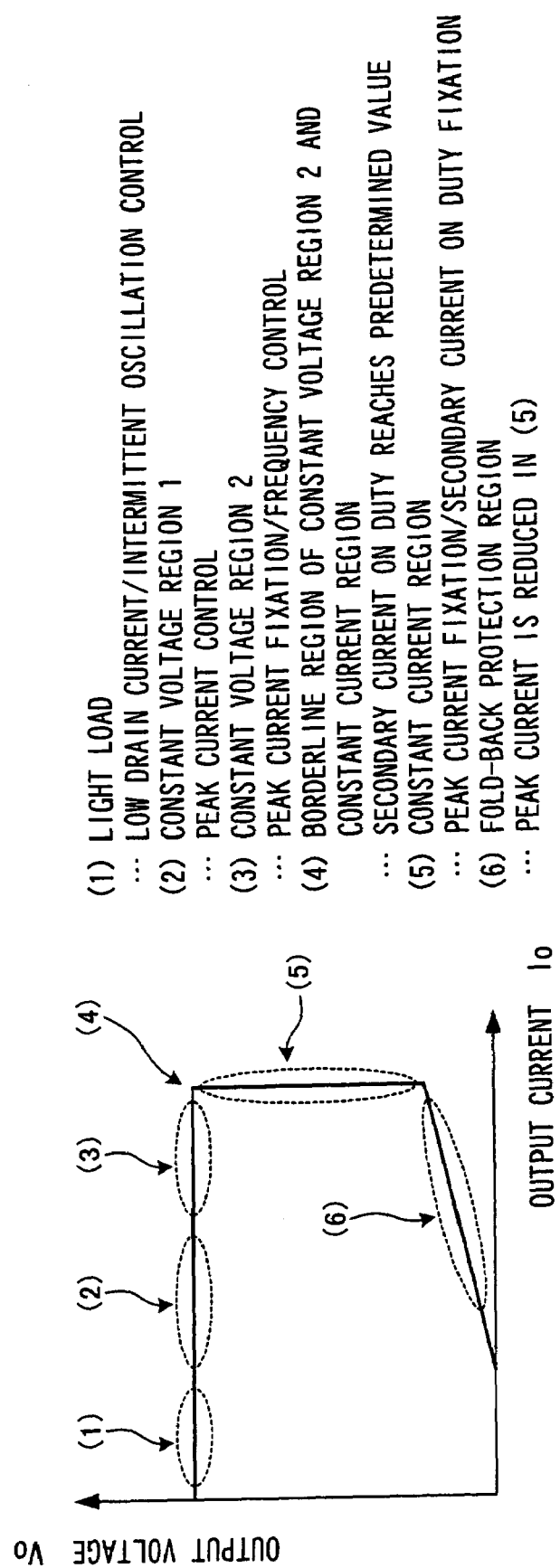

(1) LIGHT LOAD
  ... LOW DRAIN CURRENT/INTERMITTENT OSCILLATION CONTROL
(2) CONSTANT VOLTAGE REGION 1
  ... PEAK CURRENT CONTROL
(3) CONSTANT VOLTAGE REGION 2
  ... PEAK CURRENT FIXATION/FREQUENCY CONTROL
(4) BORDERLINE REGION OF CONSTANT VOLTAGE REGION 2 AND
    CONSTANT CURRENT REGION
  ... SECONDARY CURRENT ON DUTY REACHES PREDETERMINED VALUE
(5) CONSTANT CURRENT REGION
  ... PEAK CURRENT FIXATION/SECONDARY CURRENT ON DUTY FIXATION
(6) FOLD-BACK PROTECTION REGION
  ... PEAK CURRENT IS REDUCED IN (5)

F I G. 1 0
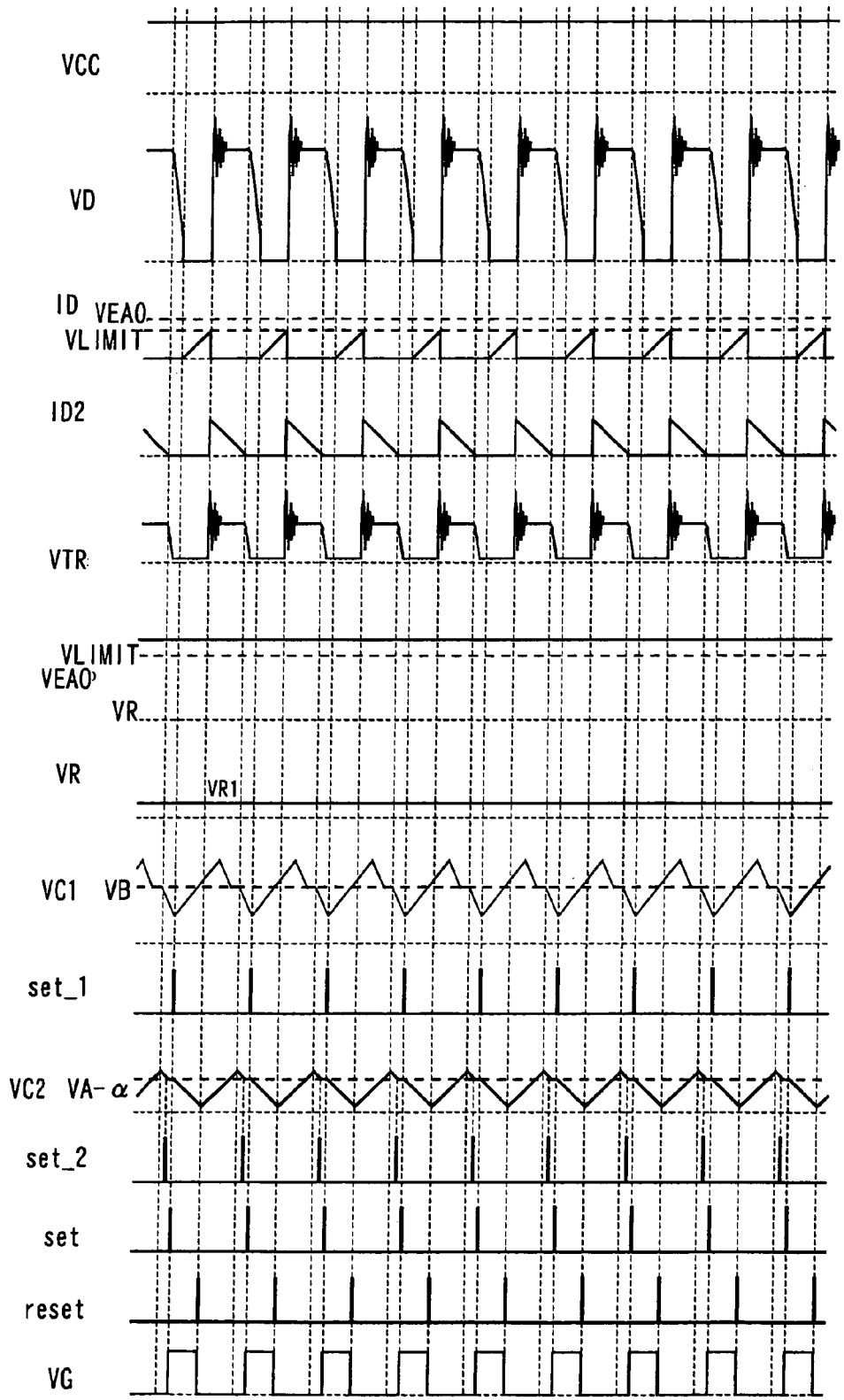

CONTROL METHOD OF SWITCHING A POWER SUPPLY CIRCUIT

CROSS REFERENCE TO RELATED APPLICATIONS

This application is a continuation of application Ser. No. 11/134,462, filed May 23, 2005, now U.S. Pat. No. 7,161,815. The present application is based on Japanese Application No. 2004-152638, filed May 24, 2004, and Japanese Patent Application No. 2004-290856, filed Oct. 4, 2004, which applications are incorporated herein by reference in their entirety.

FIELD OF THE INVENTION

The present invention relates to a switching power supply having a constant current drooping characteristic as an output characteristic.

BACKGROUND OF THE INVENTION

Conventionally, switching power supplies having a constant current drooping characteristic are used, for example, as power supplies for chargers. That is, the switching power supplies having a constant current drooping characteristic can charge batteries and so on by using the constant current drooping characteristic.

For example, in order to obtain a constant current drooping characteristic in the conventional art, the secondary side of a switching power supply comprises an output current detecting resistor for detecting an output current, a constant current control circuit for controlling current passing through the output current detecting resistor at a constant value, and a photocoupler for transmitting the signal of the constant current control circuit to the primary side. When the output current is equal to or higher than a certain value, the constant current control circuit operates.

However, the constant current control circuit and the photocoupler are expensive and the number of components is increased by using the constant current control circuit and the photocoupler. Thus, the conventional configuration cannot reduce the size and cost of the switching power supply. Further, the conventional configuration causes a power loss in the output current detecting resistor, the constant current control circuit, and the photocoupler, so that energy conservation or high efficiency cannot be achieved.

A method of improving a drooping characteristic is conventionally proposed to prevent excessive output current at overload such as a short circuit. In this method, the drooping characteristic is improved by reducing the detection level of overcurrent protection on the primary side when the output voltage on the secondary side of a switching power supply decreases to one or more predetermined output voltages (e.g., Japanese Patent Laid-Open No. 6-149396).

However, this conventional technique aims to restrict the peak value of output current at overload such as a short circuit by reducing the detection level of overcurrent protection on the primary side according to a decrease in output voltage, so that the switching power supply is safely protected from serious overload such as a short circuit. Hence, the conventional technique cannot control output current so as to have a constant current drooping characteristic when output voltage droops. Therefore, the switching power supply with a drooping characteristic improved by the conventional technique cannot be used as a charger. Moreover, when output voltage is drooped while the peak value of output current is restricted at the detection level of overcurrent protection on the primary side, variations in oscillation frequency and variations in the inductance of a transformer affect the drooping characteristic, resulting in extremely large variations in the overall drooping characteristic. Thus, it is quite difficult to obtain a constant current drooping characteristic.

Another technique for obtaining a constant current drooping characteristic is conventionally proposed in which a constant current drooping characteristic is obtained by reducing an oscillation frequency after current passing through a switching element reaches the detection level of overcurrent protection on the primary side at overload (e.g., Japanese Patent Laid-Open No. 2002-300777).

However, also in this conventional technique, variations in oscillation frequency and variations in the inductance of a transformer affect a drooping characteristic, resulting in extremely large variations in the overall drooping characteristic. Thus, it is quite difficult to obtain a constant current drooping characteristic.

DISCLOSURE OF THE INVENTION

In view of this problem, it is an object of the present invention to provide a switching power supply which can eliminate a constant current control circuit, a photocoupler, and an output current detecting resistor, eliminate the influence of variations in oscillation frequency and variations in the inductance of a transformer on a drooping characteristic, and achieve a constant current drooping characteristic of sufficient accuracy with low cost and the minimum number of components.

In order to attain the object, the switching power supply of the present invention controls the switching operation of a switching element such that when secondary current, which starts flowing to a secondary winding from the time the switching element is turned off, has an on duty reaching a predetermined value, the on duty of the secondary current is kept at the predetermined value and the peak current value of the secondary current is kept at a fixed value.

A switching power supply of the present invention, comprising a transformer having a primary winding, a secondary winding, and an auxiliary winding, a switching element for performing switching control on direct-current input voltage by means of a switching operation, the direct-current input voltage being inputted to the primary winding, an output voltage generating part which rectifies and smoothes secondary-side alternating voltage generated on the secondary winding in response to the switching operation of the switching element and generates direct-current output voltage, an auxiliary power supply which rectifies and smoothes auxiliary-side alternating voltage generated on the auxiliary winding in response to the switching operation of the switching element and generates auxiliary power supply voltage proportionate to the direct-current output voltage, and a control circuit for controlling the switching operation of the switching element, wherein the control circuit controls the switching operation of the switching element such that the on duty of secondary current is kept at a predetermined value and the peak current value of the secondary current is kept at a fixed value when the on duty of the secondary current reaches the predetermined value, the secondary current starting flowing to the secondary winding from the time the switching element is turned off.

The switching power supply of the present invention, wherein the control circuit comprises an internal circuit power supply, a regulator which supplies one of current based on the direct-current input voltage and current based on the auxiliary power supply voltage to the internal circuit power supply and keeps the voltage of the internal circuit power supply at a fixed value, an error amplifier for generating an error voltage signal according to a difference between the auxiliary power supply voltage and a stabilizing reference voltage, an element current detection circuit which detects current passing through the switching element and outputs an element current detection signal having a voltage corresponding to a current value, an oscillator for outputting a first clock signal for determining the turn-on of the switching element, an element current control circuit for determining the turn-off of the switching element when the voltage of the element current detection signal reaches the lower voltage of the voltage of the error voltage signal and an overcurrent protection reference voltage, an oscillation frequency regulating circuit for shortening the period of the first clock signal according to a difference between the voltage of the error voltage signal and the overcurrent protection reference voltage when the voltage of the error voltage signal exceeds the overcurrent protection reference voltage, a secondary current off detection circuit for detecting, according to the auxiliary-side alternating voltage, the time when the secondary current stops flowing, a secondary duty limiter circuit which detects a period from the time the switching element is turned off until the time the secondary current stops flowing and outputs a second clock signal for determining the turn-on of the switching element such that the on duty of the secondary current is set at the predetermined value, a clock signal selector circuit which is fed with the first clock signal and the second clock signal, outputs the first clock signal when the on duty of the secondary current does not reach the predetermined value, and outputs the secondary clock signal when the duty of the secondary current reaches the predetermined value, and a switching control circuit which includes a flip-flop circuit and controls the switching operation of the switching element according to the state of the flip-flop circuit, the flip-flop circuit being set when the first or second clock signal is inputted from the clock signal selector circuit and being reset when the signal for determining the turn-off of the switching element is inputted from the element current control circuit, the clock signal selector circuit selects the second clock signal and keeps the on duty of the secondary current at the predetermined value when the on duty of the secondary current reaches the predetermined value, and the element current control circuit outputs the signal for determining the turn-off of the switching element and keeps the peak current value of the secondary current at the fixed value when the voltage of the element current detection signal reaches the overcurrent protection reference voltage.

The switching power supply of the present invention, wherein the clock signal selector circuit is fed with the first clock signal from the oscillator and the second clock signal from the secondary duty limiter circuit, and outputs the signal having a longer period.

The switching power supply of the present invention, wherein the secondary duty limiter circuit outputs the second clock signal such that the on duty of the secondary current is about 50%.

The switching power supply of the present invention, wherein the regulator supplies current based on the first direct-current voltage to the internal circuit power supply and the auxiliary power supply before the switching element starts the switching operation, the regulator stops supplying current to the auxiliary power supply after the switching element starts the switching operation, the regulator supplies current based on the first direct-current voltage to the internal circuit power supply when the auxiliary power supply voltage falls below a fixed value, and the regulator supplies current based on the auxiliary power supply voltage to the internal circuit power supply when the auxiliary power supply voltage is equal to or higher than the fixed value.

The switching power supply of the present invention, wherein the control circuit comprises a light load intermittent oscillation control circuit constituted of: a light load reference voltage source which switches an output voltage from a first reference voltage to a second reference voltage when the first reference voltage and the second reference voltage higher than the first reference voltage are set and the voltage of the error voltage signal decreases to the first reference voltage, and which switches the output voltage from the second reference voltage to the first reference voltage when the voltage of the error voltage signal increases to the second reference voltage, a light load comparator for comparing the voltage of the error voltage signal and the output voltage of the light load reference voltage source, and a clock signal control circuit which receives a comparison result from the light load comparator, stops outputting the first or second clock signal from the clock signal selector circuit to the flip-flop circuit when the voltage of the error voltage signal decreases to the first reference voltage, and resumes outputting the first or second clock signal from the clock signal selector circuit to the flip-flop circuit when the voltage of the error voltage signal increases to the second reference voltage.

The switching power supply of the present invention, wherein the first reference voltage is about 15% of the overcurrent protection reference voltage and the second reference voltage is about 20% of the overcurrent protection reference voltage.

The switching power supply of the present invention, wherein the control circuit comprises an overcurrent protection reference voltage regulating circuit for reducing the overcurrent protection reference voltage according to a difference between the auxiliary power supply voltage and a set value when the auxiliary power supply voltage falls below the set value.

The switching power supply of the present invention, wherein the set value set for the overcurrent protection reference voltage regulating circuit is about 30% of the stabilizing reference voltage.

The switching power supply of the present invention, wherein the overcurrent protection reference voltage regulating circuit regulates the overcurrent protection reference voltage such that the minimum value is about 20% of the overcurrent protection reference voltage.

The switching power supply of the present invention, wherein the switching element and the control circuit are formed on the same semiconductor substrate and are configured as a semiconductor device having two connection terminals between the direct-current input voltage and the switching element, a connection terminal between the control circuit and the auxiliary power supply voltage, and the input terminal of the secondary current off detection circuit.

The present invention can eliminate a constant current control circuit, an output current detecting resistor, and a photocoupler on the secondary side, and achieve a constant current drooping characteristic of sufficient accuracy with low cost, the minimum number of components, and the minimum power loss. Therefore, it is possible to constitute a sufficiently accurate switching power supply for a charger with a small number of components and achieve low cost, miniaturization, and energy conservation for the switching power supply for a charger.

Further, in a constant current region, the peak current value of current passing through the switching element is kept constant, so that the peak current value of the secondary current is kept constant and the on duty of the secondary current is controlled at the fixed value, thereby achieving a constant output current and a constant current drooping characteristic. Further, since variations in oscillation frequency and inductance do not affect the constant current value of the output current, so that the overall variations are considerably reduced and a constant current drooping characteristic is obtained with high accuracy.

Intermittent oscillation, in which current passing through the switching element decreases in peak current value, occurs at light load. Thus, it is possible to reduce an increase in output voltage at light load, reduce power consumption, and save energy during standby.

At overload, the peak current value of current passing through the switching element is reduced according to a reduction in output voltage and the on duty of the secondary current is controlled at a fixed value. Thus, it is possible to obtain a fold-back protection function of reducing an output current as the output voltage decreases, thereby constituting a safe power supply.

The switching element and the control circuit are provided in the same semiconductor and thus simplification can be readily made. The main circuit components are formed in the single semiconductor, so that it is possible to reduce the number of components constituting the circuit and readily achieve miniaturization, light weight, and low cost.

BRIEF DESCRIPTION OF THE DRAWINGS

FIG. 6 is a block diagram showing a structural example of an overcurrent protection reference voltage regulating circuit in the switching power supply of the embodiment;

FIG. 7 is a diagram showing an example of output voltage-output current characteristic in the switching power supply of the embodiment;

FIG. 10 is a timing chart showing operations of a constant voltage region 2 in the switching power supply of the embodiment;

PREFERRED EMBODIMENT

Referring to the accompanying drawings, the following will specifically describe a switching power supply according to an embodiment of the present invention.

Figure 1:
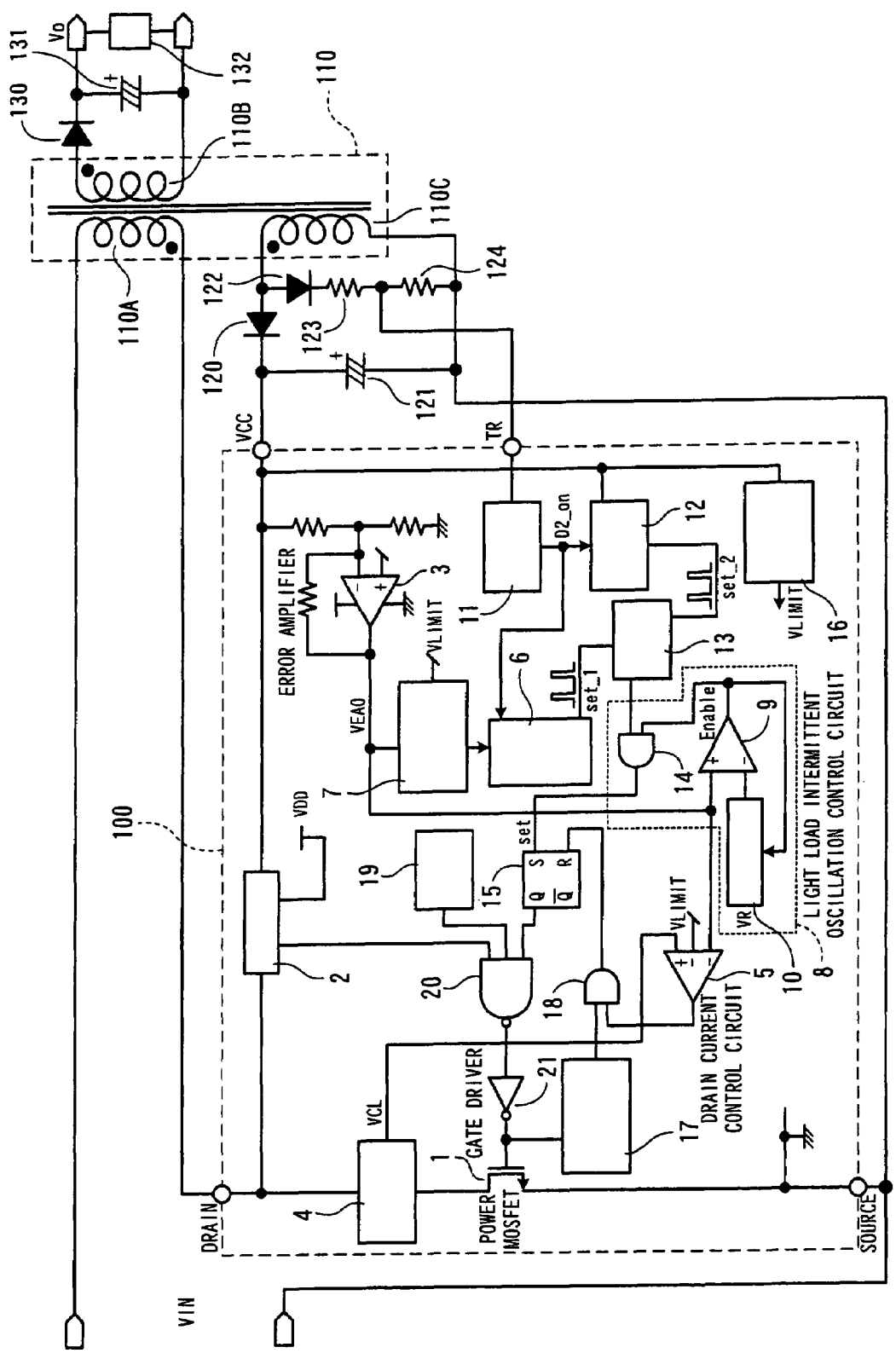
FIG. 1 is a block diagram showing a structural example of a switching power supply according to an embodiment of the present invention.

FIG. 1 is a block diagram showing a structural example of the switching power supply according to the present embodiment.

In FIG. 1, a semiconductor device 100 for controlling the switching power supply is constituted of a switching element 1 and a control circuit for controlling the switching operation of the switching element 1.

Further, the semiconductor device 100 comprises, as external input terminals, four terminals of an input terminal (DRAIN terminal) of the switching element 1, an auxiliary power supply voltage input terminal (VCC terminal), a secondary current off-timing detecting terminal (TR terminal), and a GND terminal (SOURCE terminal) of the control circuit. The GND terminal also serves as the output terminal of the switching element 1.

A transformer 110 has a primary winding 110A, a secondary winding 110B, and an auxiliary winding 110C. The primary winding 110A and the secondary winding 110B are opposite in polarity and the switching power supply is a flyback power supply.

The auxiliary winding 110C is connected to a rectifying/smoothing circuit constituted of a diode 120 and a capacitor 121. The rectifying/smoothing circuit is used as the auxiliary power supply of the semiconductor device 100. To be specific, the auxiliary power supply rectifies alternating voltage (auxiliary-side alternating voltage), which is generated on the auxiliary winding 110C in response to the switching operation of the switching element 1, smoothes the alternating voltage to generate an auxiliary power supply voltage VCC, and applies the voltage VCC to the VCC terminal. The auxiliary winding 110C has the same polarity as the secondary winding 110B, and the auxiliary power supply voltage VCC is proportionate to a direct-current output voltage VO.

The auxiliary winding 110C is connected to resistors 123 and 124 via a diode 122. The node of the resistors 123 and 124 is connected to the TR terminal.

As will be described later, voltage applied to the TR terminal (hereinafter, referred to as TR terminal voltage VTR) is used to detect the time of the end (hereinafter, referred to as off timing) of secondary current which is applied to the secondary winding 110B in response to the switching operation of the switching element 1.

The secondary winding 110B is connected to a rectifying/smoothing circuit constituted of a diode 130 and a capacitor 131. The rectifying/smoothing circuit is used as an output voltage generating part of the switching power supply. To be specific, the output voltage generating part rectifies alternating voltage (secondary-side alternating voltage), which is generated on the secondary winding 110B in response to the switching operation of the switching element 1, smoothes the alternating voltage to generate the direct-current output voltage VO, and applies the voltage VO to a load 132.

Figure 2:
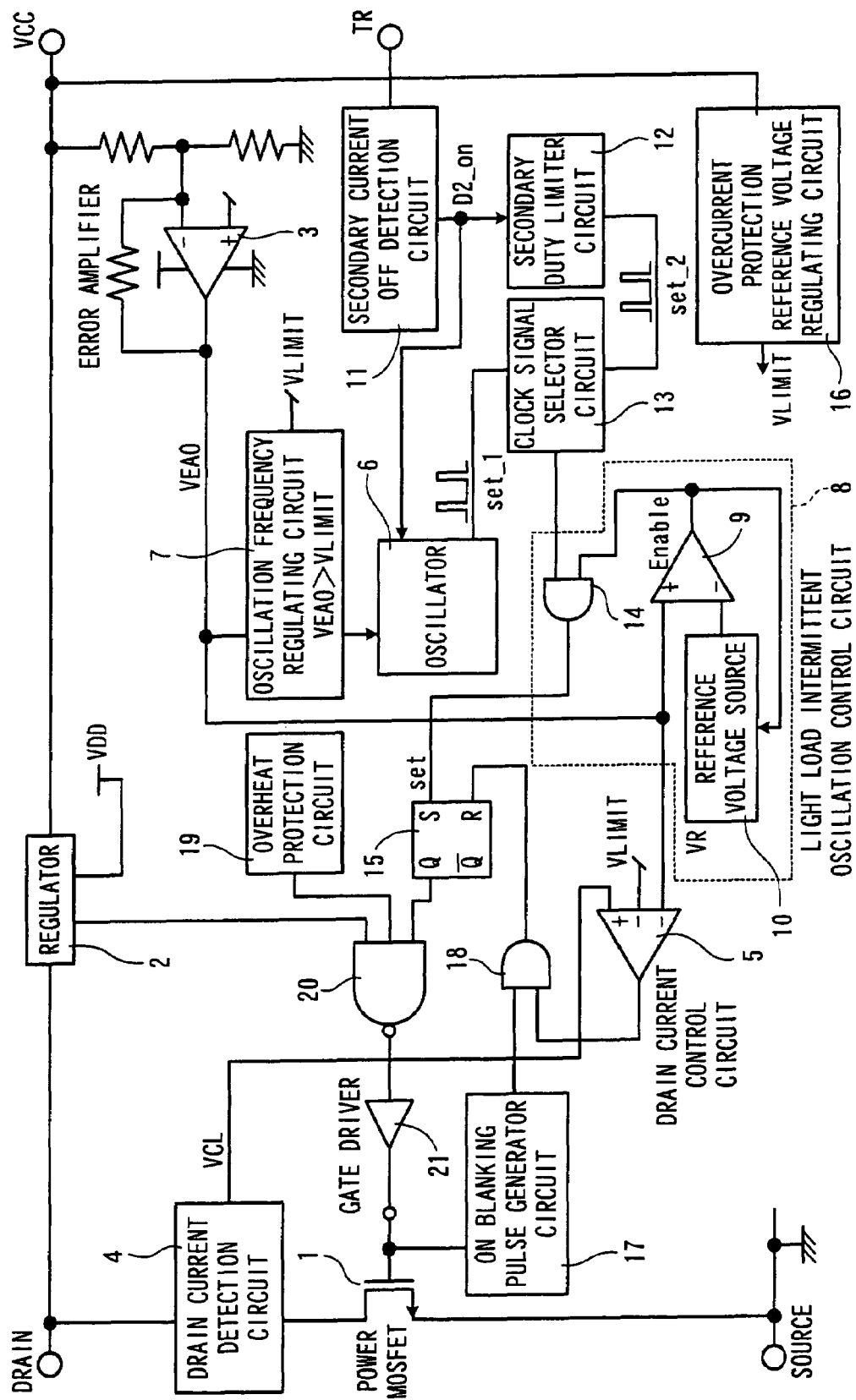
FIG. 2 is a block diagram showing a structural example of a semiconductor device for controlling the switching power supply of the embodiment.

FIG. 2 is a block diagram showing a structural example of the semiconductor device 100 for controlling the switching power supply according to the present embodiment. The semiconductor device 100 constitutes the switching power supply.

In FIG. 2, a regulator 2 supplies current from the DRAIN terminal or the VCC terminal to an internal circuit power supply VDD of the semiconductor device 100 and stabilizes the voltage of the internal circuit power supply VDD at a fixed value.

To be specific, before the switching operation of the switching element 1 is started, the regulator 2 supplies current from the DRAIN terminal to the internal circuit power supply VDD, supplies current from the DRAIN terminal to the capacitor 121 of the auxiliary power supply via the VCC terminal, and increases the voltages of the internal circuit power supply VDD and the auxiliary power supply VCC. Then, when the voltage of the internal circuit power supply VDD reaches the fixed value, the regulator 2 switches an output signal to a NAND circuit 20 from "L" level to "H" level and starts the switching operation of the switching element 1.

After the switching operation of the switching element 1 is started, the regulator 2 stops supplying current from the DRAIN terminal to the VCC terminal. A terminal for supplying current to the internal circuit power supply VDD is determined by the value of the auxiliary power supply voltage VCC after the switching operation is started.

To be specific, when the auxiliary power supply voltage VCC becomes equal to or higher than the fixed value in response to the switching operation of the switching element 1, the regulator 2 supplies current from the VCC terminal to the internal circuit power supply VDD. This configuration reduces the power consumption of the semiconductor device 100.

When the auxiliary power supply voltage VCC falls below the fixed value, for example, when the direct-current output voltage VO decreases in a constant current region, the regulator 2 supplies current from the DRAIN terminal to the internal circuit power supply VDD.

The regulator 2 operating thus stabilizes the internal circuit power supply VDD at the fixed value.

An error amplifier 3 compares a stabilization reference voltage and the auxiliary power supply voltage VCC and generates an error voltage signal VEAO according to a difference between the voltages.

A drain current detection circuit (element current detection circuit) 4 detects a current (drain current) ID passing through the switching element 1 and outputs an element current detection signal VCL, which has a voltage corresponding to a current value, to a drain current control circuit (element current control circuit) 5.

An overcurrent protection reference voltage VLIMIT serving as a reference voltage and an error voltage signal VEAO outputted from the error amplifier 3 are inputted to the drain current control circuit 5. When the voltage of the element current detection signal VCL reaches the lower one of the overcurrent protection reference voltage VLIMIT and the voltage of the error voltage signal VEAO, the drain current control circuit 5 outputs a signal for determining the turn off of the switching element 1 to an AND circuit 18 (in this case, an "H" level signal).

An oscillator 6 outputs a clock signal set_1 (first clock signal) for determining the turn on of the switching element 1 to a clock signal selector circuit 13. The frequency of the clock signal set_1 determines the oscillation frequency of the switching element 1 in a constant voltage region at light load.

When the voltage of the error voltage signal VEAO outputted from the error amplifier 3 exceeds the overcurrent protection reference voltage VLIMIT, an oscillation frequency regulating circuit 7 increases the frequency of the clock signal set_1 (shortens a period) according to a difference. That is, only when the voltage of the error voltage signal VEAO is higher than the overcurrent protection reference voltage VLIMIT, the oscillation frequency regulating circuit 7 outputs a signal having a current value corresponding to a voltage difference to the oscillator 6, and increases the frequency of the clock signal set_1 according to the voltage difference. This configuration stabilizes the direct-current output voltage VO at a fixed value even when the load 132 increases.

A light load intermittent oscillation control circuit 8, which is constituted of the comparator 9, a reference voltage source 10, and an AND circuit 14, stops/resumes inputting a clock signal outputted from the clock signal selector circuit 13 to the set terminal of a flip-flop circuit 15 according to the voltage of the error voltage signal VEAO outputted from the error amplifier 3, so that the switching operation of the switching element 1 is stopped/resumed and the switching element 1 is intermittently oscillated.

The comparator (light load comparator) 9 compares the voltage of the error voltage signal VEAO outputted from the error amplifier 3 and an output voltage VR from the reference voltage source 10, and outputs an output signal indicating a comparison result to the reference voltage source 10 and the AND circuit 14.

For the reference voltage source (light load reference voltage source) 10, a reference voltage VR1 (first reference voltage) and a reference voltage VR2 (second reference voltage), which is higher than the reference voltage VR1, are set. The reference voltage source 10 supplies one of the voltages to the inverted input terminal of the comparator 9 in response to the output signal of the comparator 9.

To be specific, when the voltage of the error voltage signal VEAO decreases to the reference voltage VR1 and the output signal of the comparator 9 is inverted from "H" level to "L" level, the reference voltage source 10 switches voltage supplied to the inverted input terminal of the comparator 9 from the reference voltage VR1 to the reference voltage VR2. When the voltage of the error voltage signal VEAO increases to the reference voltage VR2 and the output signal of the comparator 9 is inverted from "L" level to "H" level, the reference voltage source 10 switches voltage supplied to the inverted input terminal of the comparator 9 from the reference voltage VR2 to the reference voltage VR1.

The light load intermittent oscillation control circuit 8 configured thus compares the voltage of the error voltage signal VEAO and the reference voltage VR1 outputted from the reference voltage source 10. When the voltage of the error voltage signal VEAO decreases to the reference voltage VR1, the light load intermittent oscillation control circuit 8 outputs an "L" level signal to the AND circuit 14 and stops inputting the clock signal to the set terminal of the flip-flop circuit 15, so that the switching operation of the switching element 1 is stopped. The light load intermittent oscillation control circuit 8 compares the voltage of the error voltage signal VEAO and the reference voltage VR2 outputted from the reference voltage source 10. When the voltage of the error voltage signal VEAO increases to the reference voltage VR2, the light load intermittent oscillation control circuit 8 outputs an "H" level signal to the AND circuit 14 and resumes the input of the clock signal to the set terminal of the flip-flop circuit 15, so that the switching operation of the switching element 1 is restarted.

A secondary current off detection circuit 11 connected to the TR terminal detects the of f timing of secondary current based on a TR terminal voltage VTR (auxiliary-side alternating voltage) and outputs an output signal D2_on of "H" level to the oscillator 6 and a secondary duty limiter circuit 12 from the time the switching element 1 is turned off until the time the off timing of the secondary current is detected (i.e., a time period when the secondary current is applied).

In the flyback switching power supply, when the switching element 1 is turned on, current is applied to the primary winding 110A of the transformer 110 and energy is stored in the transformer 110. When the switching element 1 is turned off, the stored energy is released and secondary current is applied to the secondary winding 110B of the transformer 110. Thereafter, when the secondary current becomes 0, resonance occurs due to the inductance of the transformer 110 and the parasitic capacitance of the switching element 1. The resonance occurs on the windings of the transformer 110. The secondary current off detection circuit 11 detects a falling edge appearing on the voltage waveform of the auxiliary winding 110C after the switching element 1 is turned off, so that the off timing of the secondary current is detected.

The secondary duty limiter circuit 12 fed with the output signal D2_on of the secondary current off detection circuit 11 detects a time period from the time when the switching element 1 is turned off until the off timing of the secondary current, and the secondary duty limiter circuit 12 outputs a signal set_2 for determining the turn on of the switching element 1 to the clock signal selector circuit 13 when the on duty of the secondary current is fixed at a predetermined value.

To be specific, the output signal set_2 of the secondary duty limiter circuit 12 acts as a clock signal (second clock signal) for determining the turn on of the switching element 1 so as to keep the on duty of the secondary current at the predetermined value. The frequency of the signal decreases as the current passing through the load 132 increases and the on period of the secondary current (time period when the secondary current is applied) increases. The frequency of the clock signal set_2 determines the oscillation frequency of the switching element 1 in the constant current region and a fold-back protection region. For example, the predetermined value of the on duty of the secondary current is set at about 50% (more preferably at 50%).

The clock signal selector circuit 13 fed with the output signal set_1 of the oscillator 6 and the output signal set_2 of the secondary duty limiter circuit 12 outputs the lower frequency signal to the AND circuit 14.

To be specific, when the load is light and the frequency of the first clock signal set_1 is lower than (or equal to or lower than) that of the second clock signal set_2, the clock signal selector circuit 13 outputs the first clock signal set_1. When the load is increased and the frequency of the first clock signal set_1 is made equal to or higher than (or higher than) that of the second clock signal set_2 by the oscillation frequency regulating circuit 7, the clock signal selector circuit 13 outputs the second clock signal set_2.

Therefore, when the on duty of the secondary current is lower than the predetermined value, the clock signal selector circuit 13 outputs the first clock signal set_1 to the AND circuit 14. When the load increases and the on duty of the secondary current reaches the predetermined value, the clock signal selector circuit 13 outputs the second clock signal set_2 to the AND circuit 14 and keeps the on duty of the secondary current at the predetermined value.

The AND circuit 14 is fed with the output signal (clock signal) from the clock signal selector circuit 13 and the output signal of the comparator 9 in the light load intermittent oscillation control circuit 8, and outputs an output signal (set signal set) to the set terminal of the flip-flop circuit 15.

In this case, the clock signal selector circuit 13 and the AND circuit 14 constitute a clock signal control circuit.

When the on duty of the secondary current is lower than the predetermined value, the clock signal control circuit outputs the clock signal set_1 from the oscillator 6. When the on duty of the secondary current reaches the predetermined value, the clock signal control circuit outputs the clock signal set_2 from the secondary duty limiter circuit 12.

In response to the comparison result of the comparator 9 in the light load intermittent oscillation control circuit 8, the clock signal control circuit stops outputting the first clock signal set_1 or the second clock signal set_2 to the flip-flop circuit 15 when the voltage of the error voltage signal VEAO decreases to the reference voltage VR1. When the voltage of the error voltage signal VEAO increases to the reference voltage VR2, the clock signal control circuit resumes outputting the first clock signal set_1 or the second clock signal set_2 to the flip-flop circuit 15.

In this way, the clock signal control circuit stops/resumes the switching operation of the switching element 1 at light load in response to the output signal of the comparator 9 and intermittently oscillates the switching element 1.

When the clock signal set_1 or the clock signal set_2 is inputted to the set terminal of the flip-flop circuit 1S via the AND circuit 14, the flip-flop circuit 15 is set at the rising edge of the signal. When a signal for determining the turn off of the switching element 1 is inputted from the drain current control circuit 5 to the reset terminal of the flip-flop circuit 15 via the AND circuit 18, the flip-flop circuit 15 is reset. The flip-flop circuit 15 outputs an output signal to the NAND circuit 20 according to a set/reset state.

In this case, the flip-flop circuit 15, the NAND circuit 20, and a gate driver 21 constitute a switching control circuit. The switching control circuit controls the switching operation (repeatedly turn on/off) of the switching element 1 according to the set/reset state of the flip-flop circuit 15.

When the auxiliary power supply voltage VCC is lower than a set value, an overcurrent protection reference voltage regulating circuit 16 reduces the overcurrent protection reference voltage VLIMIT according to a difference. With this configuration, in the case of overload such as a load short circuit, the peak current value of the drain current ID passing through the switching element 1 decreases according to a reduction in the direct-current output voltage VO and the on duty of the secondary current is fixed at the predetermined value.

Therefore, in the case of overload such as a load short circuit, the switching power supply can reduce the output current IO as the direct-current output voltage VO decreases, achieving fold-back protection with safety.

During a set time from the time a turn-on pulse signal for turning on the switching element 1 is outputted from the gate driver 21, an on blanking pulse generator circuit 17 outputs an "L" level signal to the AND circuit 18.

Therefore, the switching power supply can prevent erroneous detection caused by spike current when turned on.

The AND circuit 18 is fed with the output signal of the drain current control circuit 5 and the output signal of the on blanking pulse generator circuit 17, and outputs an output signal to the reset terminal of the flip-flop circuit 15.

When the semiconductor device 100 is equal to or higher than a set temperature, an overheat protection circuit 19 outputs an "L" level signal to the NAND circuit 20 and stops the switching operation of the switching element 1.

The NAND circuit 20 is fed with the output signal of the regulator 2, the output signal of the flip-flop circuit 15, and the output signal of the overheat protection circuit 19 and outputs an output signal to the gate driver 21.

The gate driver 21 fed with the output signal of the NAND circuit 20 outputs the turn-on pulse signal for controlling the switching operation of the switching element 1 to the control terminal (gate terminal) of the switching element 1. The switching element 1 performs the switching operation, in which the switching element 1 is repeatedly turned on/off, in response to the turn-on pulse signal from the gate driver 21.

By the switching operation, the switching element 1 performs switching control on a direct-current input voltage VIN inputted to the primary winding 110A of the transformer 110, generates secondary-side alternating voltage on the secondary winding 110B, and generates auxiliary-side alternating voltage on the auxiliary winding 110C.

As described above, the control circuit fixes the peak current value of the drain current ID passing through the switching element 1 at a current value determined by the overcurrent protection reference voltage VLIMIT. When the on duty of the secondary current reaches the predetermined value, the secondary current starting flowing to the secondary winding 110B of the transformer 110 after the switching element 1 is turned off, the control circuit controls the switching operation of the switching element 1 so as to keep the on duty of the secondary current at the predetermined value. The control circuit can eliminate a constant current control circuit, an output current detecting resistor, and a photocoupler on the secondary side, and achieve a constant current drooping characteristic of sufficient accuracy with low cost, the minimum number of components, and the minimum power loss.

Therefore, according to the switching power supply, it is possible to constitute a sufficiently accurate switching power supply for a charger with few components, and achieve low cost, miniaturization, and energy conservation for the switching power supply for a charger.

The switching element 1 and the control circuit are formed on the same semiconductor substrate and constitute the semiconductor device 100, thereby reducing the number of components constituting the circuit. It is possible to readily achieve miniaturization, light weight, and low cost.

Figure 3:
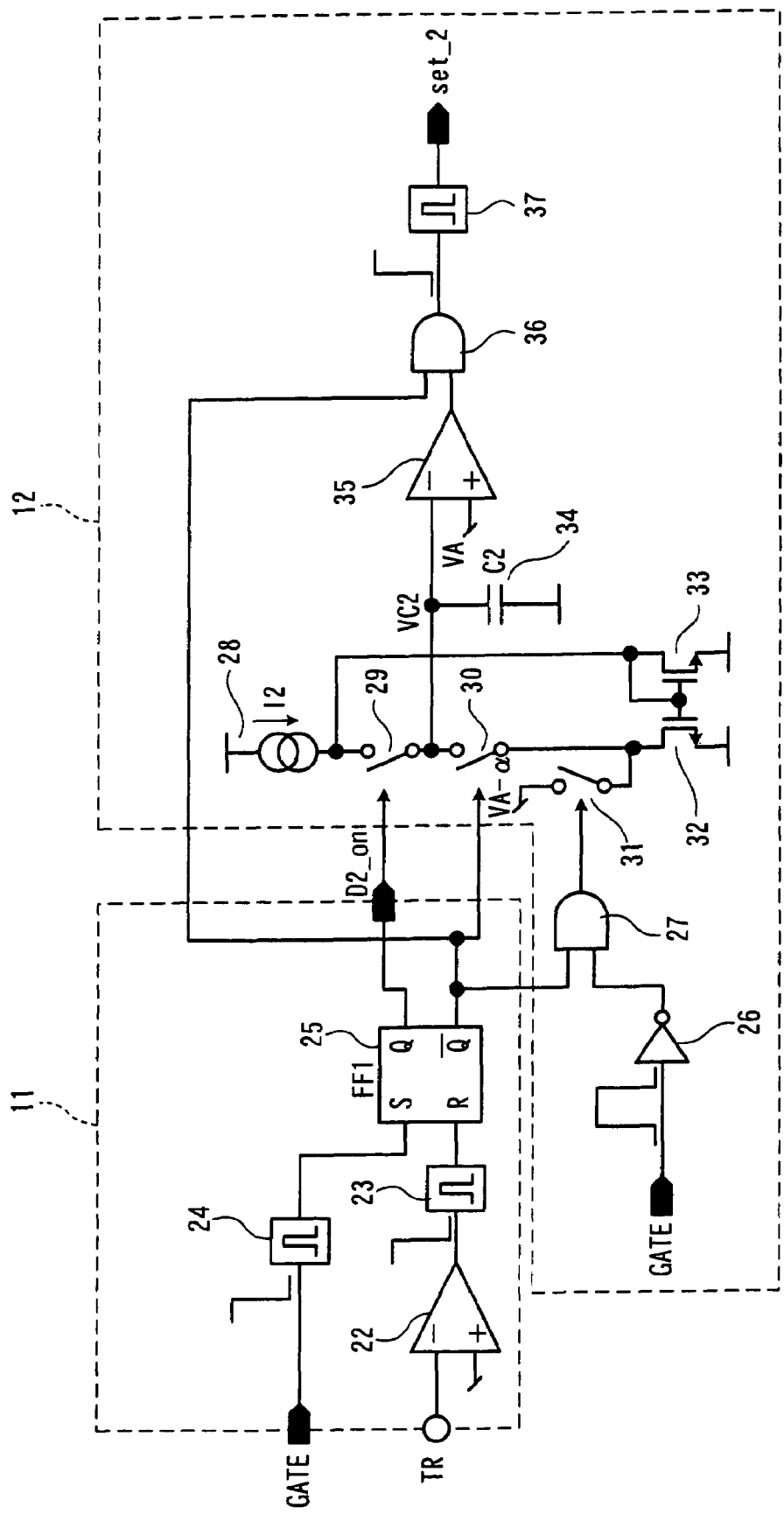
FIG. 3 is a block diagram showing a structural example of a secondary current off detection circuit and a secondary duty limiter circuit in the switching power supply of the embodiment.

FIG. 3 is a block diagram showing a structural example of the secondary current off detection circuit 11 and the secondary duty limiter circuit 12 which constitute a part of the semiconductor device 100 for controlling the switching power supply according to the present embodiment.

The secondary current off detection circuit 11 is constituted of a comparator 22, one-pulse signal generator circuits 23 and 24, and a flip-flop circuit 25. The elements are connected to one another as shown in FIG. 3.

The one-pulse signal generator circuit 24 fed with the output signal of the gate driver 21 generates a one-pulse signal at the falling edge of the turn-on pulse signal (when the switching element 1 is turned off) which is the output signal of the gate driver 21, and the one-pulse signal generator circuit 24 inputs the one-pulse signal to the set terminal of the flip-flop circuit 25.

The comparator 22 compares the TR terminal voltage VTR and the reference voltage and detects a fall in the TR terminal voltage VTR, that is, a falling edge on the voltage waveform of the auxiliary winding 110C after the switching element 1 is turned off, and the comparator 22 outputs an output signal to the one-pulse signal generator circuit 23. In this way, the secondary current off detection circuit 11 detects the off timing of the secondary current.

The one-pulse signal generator circuit 23 fed with the output signal of the comparator 22 generates a one-pulse signal when the TR terminal voltage VTR falls below the reference voltage (the off timing of the secondary current), and the one-pulse signal generator circuit 23 inputs the one-pulse signal to the reset terminal of the flip-flop circuit 25. Therefore, at the first falling edge of the TR terminal voltage VTR (the off timing of the secondary current) after the switching element 1 is turned off, the output signal and the inverted output signal of the flip-flop circuit 25 are inverted.

With this configuration, from the time the switching element 1 is turned off until the end of the application of the secondary current, that is, in a period when the secondary current is applied (the on period of the secondary current), the output signal of the flip-flop circuit 25 is at "H" level and the inverted output signal is at "L" level. Then, the output signal and the inverted output signal of the flip-flop circuit 25 are inverted at the off timing of the secondary current. From the time the subsequent turn-on pulse signal is inputted to the switching element 1 until the time the switching element 1 is turned off (in a period when the secondary current is not applied), the output signal is at "L" level and the inverted output signal is at "H" level.

The secondary duty limiter circuit 12 is constituted of an inverter circuit 26, AND circuits 27 and 36, a constant current source 28, switches 29, 30, 31, NchMOSFETs 32 and 33, a capacitor 34, a comparator 35, and a one-pulse signal generator circuit 37. The elements are connected to one another as shown in FIG. 3.

The switches 29 and 30 are turned on and off in response to the output signal and the inverted output signal of the flip-flop circuit 25 in the secondary current off detection circuit 11. The capacitor 34 is charged and discharged by the operations of the switches 29 and 30.

To be specific, from the time the switching element 1 is turned off until the end of the application of the secondary current (in a period when the secondary current is applied), the output signal of the flip-flop circuit 25 is at "H" level and the inverted output signal is at "L" level. Thus, the switch 29 is turned on, the switch 30 is turned off, the capacitor 34 is charged by a constant current I2 of the constant current source 28, and a voltage VC2 of the capacitor 34 increases. From the end of the application of the secondary current until the subsequent turn-on pulse signal is inputted and the switching element 1 is turned off (in a period when the secondary current is not applied), the switch 29 is turned off and the switch 30 is turned on, so that the capacitor 34 is discharged. Discharge current at that time is determined by the constant current I2 of the constant current source 28 and a current mirror circuit constituted of the NchMOSFETs 32 and 33.

The inverter circuit 26 fed with the output signal of the gate driver 21 outputs an "H" level signal during the off period of the switching element 1.

The AND circuit 27 fed with the inverted output signal of the flip-flop circuit 25 and the output signal of the inverter circuit 26 turns on the switch 31 to apply a reference voltage (VA-α) to the drain terminal of the NchMOSFET 32 when the secondary current is not applied during the off-period of the switching element.

Therefore, when the switch 29 is turned off, the switch 30 is turned on, and the switch 31 is turned on, that is, when the secondary current is not applied and the switching element 1 is turned off, a voltage VC2 of the capacitor 34 is kept at the reference voltage (VA-α). In other words, there is a period when the voltage VC2 is kept at the fixed value (VA-α) in the discharge period of the capacitor 34. This configuration fixes the discharge start voltage of the capacitor 34 when the switching element 1 is turned on.

The comparator 35 compares the voltage VC2 of the capacitor 34 and a reference voltage VA and outputs a signal (comparison result) to the AND circuit 36. When the voltage VC2 of the capacitor 34 is lower than the reference voltage VA, the output of the comparator 35 has an "H" level signal. When the voltage VC2 of the capacitor 34 is higher than the reference voltage VA, the output of the comparator 35 has an "L" level signal.

The AND circuit 36 is fed with the inverted output signal of the flip-flop circuit 25 and the output signal of the comparator 35, and outputs an output signal to the one-pulse signal generator circuit 37.

When the output signal of the AND circuit 36 is inverted from "L" level to "H" level, that is, in a period when the secondary current is not applied, the one-pulse signal generator circuit 37 outputs the one-pulse signal (clock signal) set_2 to the clock signal selector circuit 13 when the voltage VC2 of the capacitor 34 is lower than the reference voltage VA.

With this configuration, the capacitor 34, which has been fixed at the reference voltage (VA-α) when the switching element 1 is turned on, starts charging concurrently with the turn-on of the switching element 1. Then, the capacitor 34 is switched from discharging to charging when the switching element 1 is turned off, is charged during the application of the secondary current, and is switched again from charging to discharging when the secondary current is turned off. Then, when the voltage VC2 of the capacitor 34 falls below the reference voltage VA again, the one-pulse signal generator circuit 37 outputs the one-pulse signal (clock signal) set_2.

Therefore, the one-pulse signal set_2 is outputted such that the switching element 1 is turned on when the on duty of the secondary current has the predetermined value.

In this way, the secondary duty limiter circuit 12 outputs, to the clock signal selector circuit 13, the clock signal set_2 for setting the on duty of the secondary current at the predetermined value.

Figure 4:
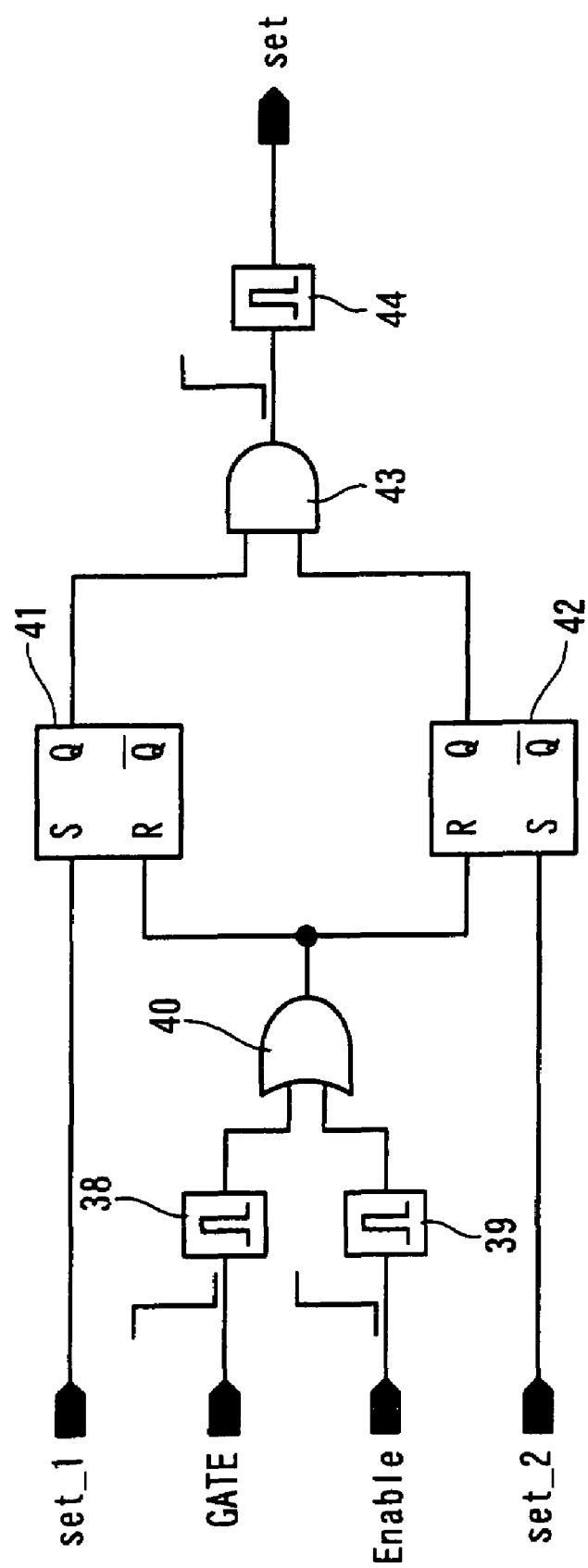
FIG. 4 is a block diagram showing a structural example of a clock signal selector circuit in the switching power supply of the embodiment.

FIG. 4 is a block diagram showing a structural example of the clock signal selector circuit 13 which constitutes a part of the semiconductor device 100 for controlling the switching power supply according to the present embodiment.

The clock signal selector circuit 13 is constituted of one-pulse signal generator circuits 38, 39, and 44, an OR circuit 40, flip-flop circuits 41 and 42, and an AND circuit 43. The elements are connected to one another as shown in FIG. 4.

The one-pulse signal generator circuit 38 fed with the output signal of the gate driver 21 generates a one-pulse signal at the falling edge of the turn-on pulse signal (when the switching element 1 is turned off) which is the output signal of the gate driver 21, and the one-pulse signal generator circuit 38 inputs the one-pulse signal to the-OR circuit 40.

The one-pulse signal generator circuit 39 fed with the output signal of the comparator 9 in the light load intermittent oscillation control circuit 8 generates a one-pulse signal at the rising edge of the output signal of the comparator 9, that is, when the switching operation of the switching element 1 is resumed in a light load intermittent oscillation period, and the one-pulse signal generator circuit 39 inputs the one-pulse signal to the OR circuit 40.

The OR circuit 40 inputs an output signal to the reset terminals of the flip-flop circuits 41 and 42. To be specific, the OR circuit 40 inputs an "H" level signal to the reset terminals of the flip-flop circuits 41 and 42 when the switching element 1 is turned off or when the switching operation of the switching element 1 is resumed in the light load intermittent oscillation period.

The set terminal of the flip-flop circuit 41 is fed with the output signal (clock signal set_1 ) of the oscillator 6, the reset terminal of the flip-flop circuit 41 is fed with the output signal of the OR circuit 40, and the flip-flop circuit 41 outputs an output signal to the AND circuit 43.

The set terminal of the flip-flop circuit 42 is fed with the output signal (clock signal set_2) of the secondary duty limiter circuit 12, the reset terminal of the flip-flop circuit 42 is fed with the output signal of the OR circuit 40, and the flip-flop circuit 42 outputs an output signal to the AND circuit 43.

The AND circuit 43 is fed with the output signals of the flip-flop circuits 41 and 42, and outputs an output signal to the one-pulse signal generator circuit 44.

The one-pulse signal generator circuit 44 outputs a one-pulse signal set to the AND circuit 14 when the output signal of the AND circuit 43 is inverted from "L" level to "H" level. To be specific, the one-pulse signal generator circuit 44 outputs the one-pulse signal set after the clock signal set_1 and the clock signal set_2 rise.

With this configuration, the clock signal selector circuit 13 outputs the lower frequency signal of the output signal set_1 of the oscillator 6 and the output signal set_2 of the secondary duty limiter circuit 12 to the AND circuit 14.

Therefore, when the on duty of the secondary current is lower than the predetermined value, the clock signal selector circuit 13 outputs the first clock set_1 to the AND circuit 14. When the on duty of the secondary current reaches the predetermined value, the clock signal selector circuit 13 outputs the second clock signal set_2 to the AND circuit 14 and keeps the on duty of the secondary current at the predetermined value.

Figure 5:
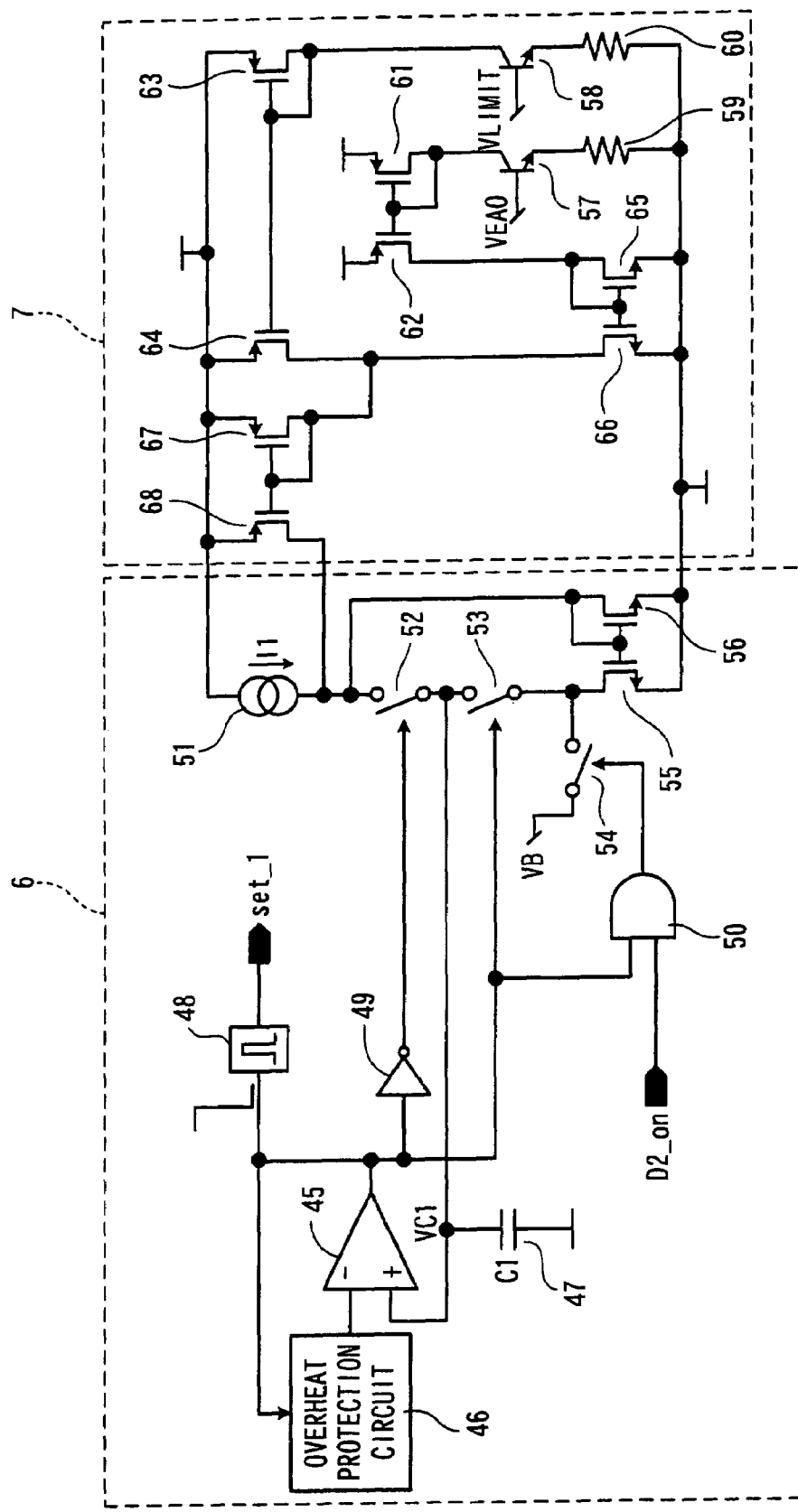
FIG. 5 is a block diagram showing a structural example of an oscillator and an oscillation frequency regulating circuit in the switching power supply of the embodiment.

FIG. 5 is a block diagram showing a structural example of the oscillator 6 and the oscillation frequency regulating circuit 7 which constitute a part of the semiconductor device 100 for controlling the switching power supply according to the present embodiment.

The oscillator 6 is constituted of a comparator 45, a reference voltage source 46, a capacitor 47, a one-pulse signal generator circuit 48, an inverter circuit 49, an AND circuit 50, a constant current source 51, switches 52, 53, and 54, and MOSFETs 55 and 56. The elements are connected to one another as shown in FIG. 5.

The comparator 45 compares a voltage VC1 of the capacitor 47 and a reference voltage of the reference voltage source 46. When the voltage VC1 of the capacitor 47 is lower than the reference voltage, the comparator 45 outputs an "L" level signal. When the voltage VC1 of the capacitor 47 is higher than the reference voltage, the comparator 45 outputs an "H" level signal.

Two different reference voltages V1 and V2 switched in response to the output signal of the comparator 45 are set for the reference voltage source 46. The reference voltage V2 is higher than the reference voltage V1. The reference voltage of the reference voltage source 46 is switched from the reference voltage V1 to the reference voltage V2 when the output signal of the comparator 45 is inverted from "H" level to "L" level. The reference voltage is switched from the reference voltage V2 to the reference voltage V1 when the output signal is inverted from "L" level to "H" level.

When the voltage VC1 of the capacitor 47 is lower than the reference voltage V1, the output signal of the comparator 45 is inverted from "H" level to "L" level, the switch 52 is turned on, the switch 53 is turned off, a constant current I1 of the constant current source 51 charges the capacitor 47, and the voltage VC1 of the capacitor 47 increases. When the voltage VC1 of the capacitor 47 exceeds the reference voltage V2, the output signal of the comparator 45 is inverted from "L" level to "H" level, the switch 52 is turned off, the switch 53 is turned on, and the capacitor 47 is discharged. A discharge current at that time is determined by the constant current I1 of the constant current source 51 and a current mirror circuit constituted of the NchMOSFETs 55 and 56.

In this way, the switches 52 and 53 are turned on and off in response to the output signal of the comparator 45 to charge and discharge the capacitor 47. The voltage VC1 of the capacitor 47 has a waveform oscillating between the two reference voltages V1 and V2.

The AND circuit 50 is fed with the output signal D2_on of the flip-flop circuit 25 in the secondary current off detection circuit 11 and the output signal of the comparator 45. When the output signal D2_on is at "H" level, that is, when the secondary current is applied, the AND circuit 50 turns on the switch 54 and applies a reference voltage VB to the drain terminal of the NchMOSFET 55.

Therefore, when the voltage VC1 of the capacitor 47 decreases to the reference voltage VB during a discharge period, the voltage VC1 is kept at the reference voltage VB until the end of the application of the secondary current.

When the output signal of the comparator 45 is inverted from "H" level to "L" level, that is, when the capacitor 47 is switched from a discharge period to a charge period, the one-pulse signal generator circuit 48 outputs the one-pulse signal (clock signal) set_1.

As described above, the voltage VC1 of the capacitor 47 does not fall below the reference voltage VB in a period when the secondary current is applied. In other words, the one-pulse signal set_1 is not outputted before the end of the application of the secondary current. That is, the switching power supply always operates in a discontinuous mode.

With this configuration, the oscillator 6 out puts the clock signal set_1 for determining the oscillation frequency of the switching element 1 to the clock signal selector circuit 13.

The oscillation frequency regulating circuit 7 is constituted of NPN transistors 57 and 58, resistors 59 and 60, PchMOSFETs 61, 62, 63, 64, 67, and 68 and NchMOSFETs 65 and 66. The elements are connected to one another as shown in FIG. 5.

The error voltage signal VEAO is inputted to the base terminal of the NPN transistor 57. Thus, current proportionate to the voltage of the error voltage signal VEAO passes through the NchMOSFET 66. The PchMOSFETs 61 and 62 constitute a current mirror circuit and the NchMOSFETs 65 and 66 constitute a current mirror circuit.

The overcurrent protection reference voltage VLIMIT is inputted to the base terminal of the NPN transistor 58. Thus, current proportionate to the overcurrent protection reference voltage VLIMIT passes through the PchMOSFET 64. The PchMOSFETs 63 and 64 constitute a current mirror circuit.

When the current passing though the NchMOSFET 66 is lower than that of the PchMOSFET 64, no current passes through a current mirror circuit constituted of the PchMOSFETs 67 and 68. When the current passing though the NchMOSFET 66 is higher than that of the PchMOSFET 64, a current corresponding to a difference between the current passing through the NchMOSFET 66 and the current passing through the PchMOSFET 64 is applied to the current mirror circuit constituted of the PchMOSFETs 67 and 68. Then, the current passing through the PchMOSFET 68 is added to the constant current I1 of the constant current source 51, and the charge/discharge period of the capacitor 47 is shortened.

Therefore, when the voltage of the error voltage signal VEAO is higher than the overcurrent protection reference voltage VLIMIT, the clock signal set_1 outputted from the oscillator 6 also increases in frequency. The larger difference, the higher frequency.

With this configuration, only when the voltage of the error voltage signal VEAO is higher than the overcurrent protection reference voltage VLIMIT, the oscillation frequency regulating circuit 7 outputs a signal having a current value corresponding to a voltage difference to the oscillator 6. When the voltage of the error voltage signal VEAO is higher than the overcurrent protection reference voltage VLIMIT, the frequency of the clock signal set_1 outputted from the oscillator 6 increases according to an increasing difference.

FIG. 6 is a block diagram showing a structural example of the overcurrent protection reference voltage regulating circuit 16 which constitutes a part of the semiconductor device 100 for controlling the switching power supply according to the present embodiment.

The overcurrent protection reference voltage regulating circuit 16 is constituted of resistors 69, 70, 73, and 86, a comparator 71, a NPN transistor 72, PchMOSFETs 74, 75, 84, and 85, NchMOSFETs 76, 77, 79, 80, 82, and 83, constant current sources 78 and 81, and a switch 87. The elements are connected to one another as shown in FIG. 6.

The comparator 71 compares the auxiliary power supply voltage VCC, which is divided by the resistor 69 and the resistor 70, and the reference voltage. When the auxiliary power supply voltage VCC falls below a set value, the comparator 71 outputs an "H" level signal and turns on the switch 87.

The auxiliary power supply voltage VCC divided by the resistor 69 and the resistor 70 is converted into a current I6, which is proportionate to the auxiliary power supply voltage VCC, by the NPN transistor 72 and the resistor 73.

The current I6 passes through the current mirror circuit constituted of the PchMOSFETs 74 and 75 and a current mirror circuit constituted of the NchMOSFETs 76 and 77.

When the auxiliary power supply voltage VCC is lower than the set value, the switch 87 is turned on. Thus, a constant current I4 set by the constant current source 78 passes through the switch 87, and a current obtained by subtracting the current I6 from the constant current I4 passes through a current mirror circuit constituted of the NchMOSFETs 79 and 80. Further, a current I7 passes through a current mirror circuit constituted of the NchMOSFETs 82 and 83 and a current mirror circuit constituted of the PchMOSFETs 84 and 85. The current I7 is obtained by subtracting a current, which is obtained by subtracting the current I6 from the constant current I4, from a constant current I5 set by the constant current source 81.

Then, voltage generated by the current I7 and a resistance value R1 of the resistor 86 is outputted as the overcurrent protection reference voltage VLIMIT. To be specific, the overcurrent protection reference voltage VLIMIT is expressed as below:

$$VLIMIT = R1 \times I7 = R1 \times (I5 - (I4 - I6))$$

The current I6 is proportionate to the auxiliary power supply voltage VCC and thus the overcurrent protection reference voltage VLIMIT is proportionate to the auxiliary power supply voltage VCC.

However, when the auxiliary power supply voltage VCC divided by the resistors 69 and 70 is higher than the reference voltage of the comparator 71, the switch 87 is turned off. Thus, the current passing through the resistor 86 is equal to the constant current I5 set by the constant current source 81.

Therefore, when the auxiliary power supply voltage VCC is equal to or higher than the set value, the overcurrent protection reference voltage VLIMIT remains constant. When the auxiliary power supply voltage VCC falls below the set value, the overcurrent protection reference voltage VLIMIT decreases according to a reduction in the auxiliary power supply voltage VCC.

In this way, only when the auxiliary power supply voltage VCC is lower than the set value, the overcurrent protection reference voltage regulating circuit 16 reduces the overcurrent protection reference voltage VLIMIT according to a reduction in the auxiliary power supply voltage VCC.

The following will describe the operations of the switching power supply configured thus.

Before the switching operation is started, for example, when the direct-current input voltage VIN obtained by rectifying and smoothing a commercial alternating power supply is inputted to the input terminal of the switching power supply, the direct-current input voltage VIN is applied to the DRAIN terminal of the semiconductor device 100 via the primary winding 110A of the transformer 110. The regulator 2 supplies current from the DRAIN terminal to the internal circuit power supply VDD according to the direct-current input voltage VIN, supplies current to the capacitor 121 of the auxiliary power supply via the VCC terminal according to the direct-current input voltage VIN, and increases the voltage of the internal circuit power supply VDD and the auxiliary power supply voltage VCC. When the voltage of the internal circuit power supply VDD reaches a fixed value, the switching element 1 starts the switching operation.

When the switching element 1 starts the switching operation, energy is supplied to the windings of the transformer 110, alternating voltage is generated on the secondary winding 110B and the auxiliary winding 110C, and current passes through the windings.

Power generated on the secondary winding 110B (secondary-side alternating voltage and secondary current) is rectified and smoothed into direct-current power (direct-current output voltage VO and output current IO) by the diode 130 and the capacitor 131, and the power is supplied to the load 132.

Power generated on the auxiliary winding 110C (auxiliary-side alternating voltage and auxiliary side current) is rectified and smoothed by the diode 120 and the capacitor 121, and the power is used as the auxiliary power supply of the semiconductor device 100. The auxiliary winding 110C has the same polarity as the secondary winding 110B, and thus the auxiliary power supply voltage VCC is proportionate to the direct-current output voltage VO.

When the switching element 1 starts the switching operation, the direct-current output voltage VO and the auxiliary power supply voltage VCC increase. When the auxiliary power supply voltage VCC increases, the error voltage signal VEAO of the error amplifier 3 decreases in voltage.

When the voltage of the error voltage signal VEAO decreases, the drain current control circuit 5 controls the switching element 1 so as to reduce the drain current ID passing through the switching element 1. Such negative feedback stabilizes the direct-current output voltage VO. In other words, the auxiliary power supply voltage VCC is also used to stabilize the direct-current output voltage VO.

The auxiliary-side alternating voltage generated on the auxiliary winding 110C is rectified by the diode 122, divided by the resistors 123 and 124, and inputted to the TR terminal.

When the secondary current passing through the secondary winding 110B becomes 0, resonance occurs due to the inductance of the transformer 110 and the parasitic capacitance of the switching element 1. The secondary current off detection circuit 11 detects a falling edge on the voltage waveform of the auxiliary winding 110C after the switching element 1 is turned off, so that the off timing of the secondary current is detected.

After the switching operation is started, the regulator 2 stops supplying current to the auxiliary power supply. When the auxiliary power supply voltage VCC is equal to or higher than a fixed value, the regulator 2 supplies current from the VCC terminal to the internal circuit power supply VDD according to the auxiliary power supply voltage VCC. Therefore, the switching power supply can reduce the power consumption of the semiconductor device 100 in a normal operation.

When the auxiliary power supply voltage VCC falls below the fixed value, the regulator 2 supplies current from the DRAIN terminal to the internal circuit power supply VDD according to the direct-current input voltage VIN.

The switching element 1 performs the switching operation in response to the output signal of the flip-flop circuit 15. The output signal is inputted via the NAND circuit 20 and the gate driver 21.

The output signal (one-pulse signal) set_1 of the oscillator 6 or the output signal (one-pulse signal) set_2 of the secondary duty limiter circuit 12 is inputted to the set terminal of the flip-flop circuit 15 via the clock signal selector circuit 13 and the AND circuit 14. When the output signal set_1 or the output signal set_2 is inputted to the set terminal of the flip-flop circuit 15, the turn-on pulse signal is inputted to the switching element 1 and the switching element 1 is turned on.

The output signals of the on blanking pulse generator circuit 17 and the drain current control circuit 5 are inputted to the reset terminal of the flip-flop circuit 15 via the AND circuit 18. The output signal of the drain current control circuit 5 is outputted when the element current detection signal VCL of the drain current detection circuit 4 reaches the lower one of the overcurrent protection reference voltage VLIMIT and the voltage of the error voltage signal VEAO. Therefore, when the drain current ID reaches a current value determined by the voltage of the error voltage signal VEAO or the overcurrent protection reference voltage VLIMIT, the switching element 1 is turned off.

As described above, the basic operation of the switching power supply is performed according to the peak current control system for fixing an oscillation frequency. Further, as shown in FIG. 7, an operation performed after the switching element 1 starts the switching operation and the direct-current output voltage VO is stabilized is varied according to the state of output current passing through the load 132.

The following will describe the operations of the switching power supply in states of <(1) light load>, <(2) constant voltage region 1>, <(3) constant voltage region 2>, <(4)

borderline region between constant voltage region 2 and constant current region>, <(5) constant current region>, <(6) fold-back protection region> in the order from a light load to a heavy load of the load 132.

<(1) Light Load>

Figure 8:
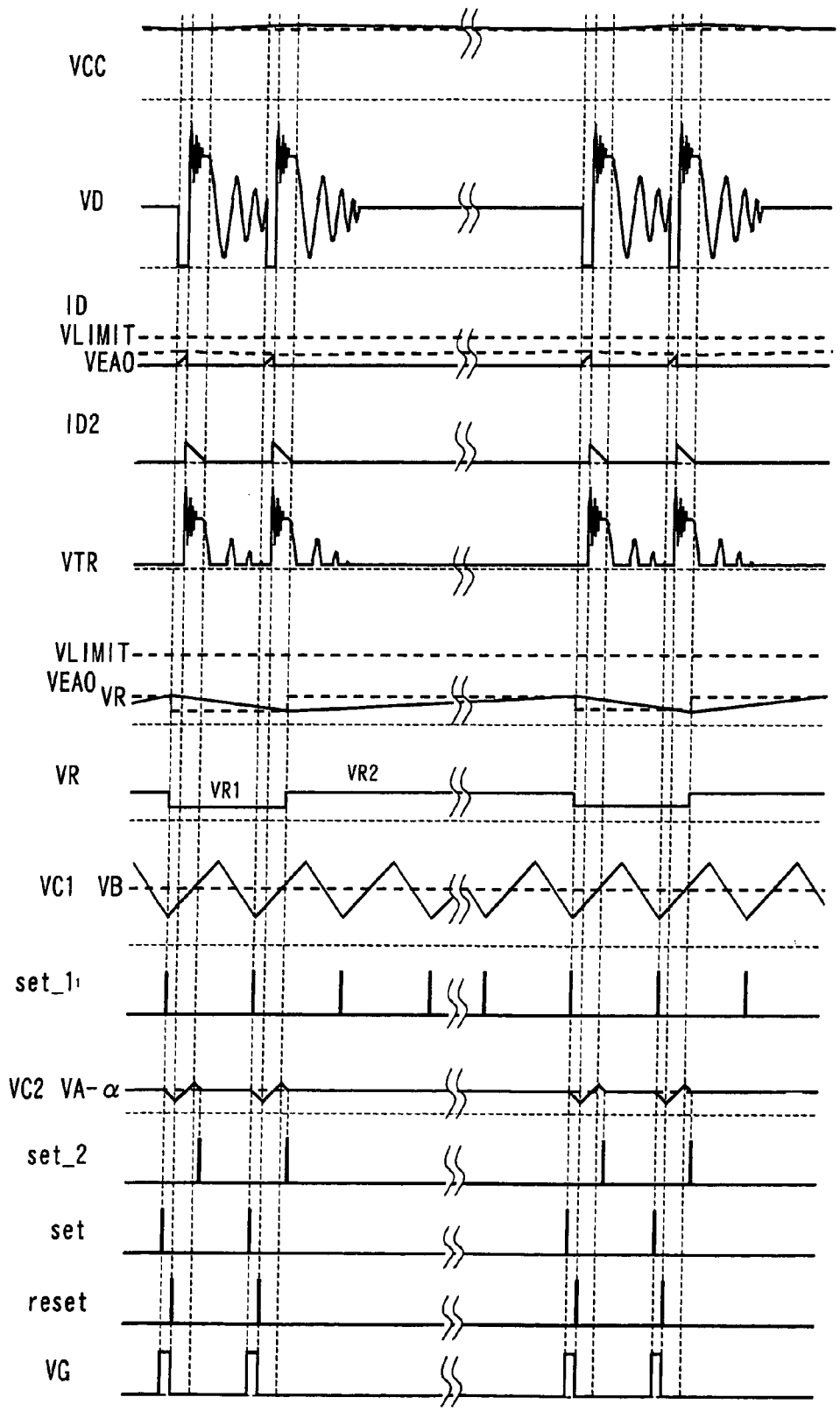
FIG. 8 is a timing chart showing operations at light load in the switching power supply of the embodiment.
Figure 9:
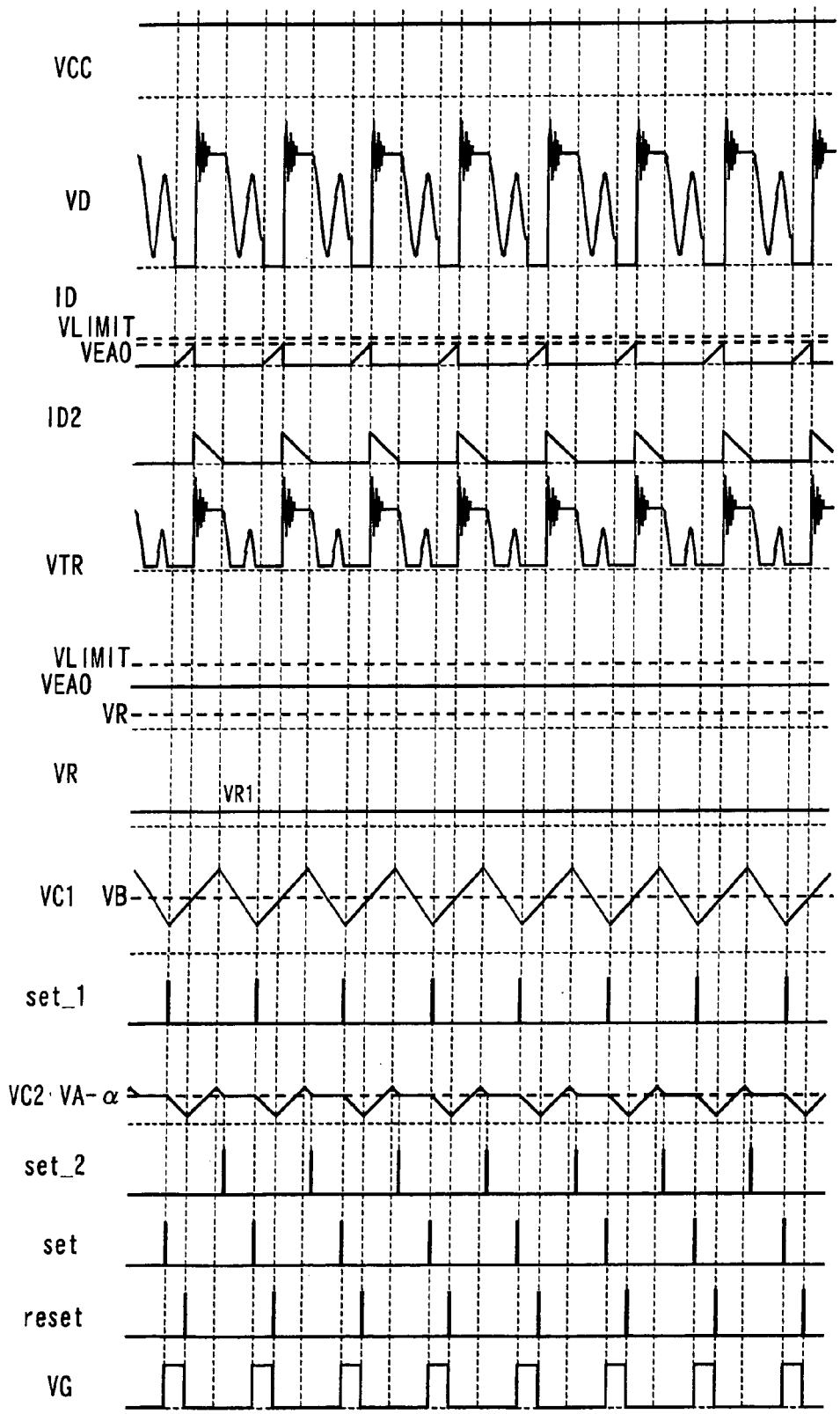
FIG. 9 is a timing chart showing operations of a constant voltage region 1 in the switching power supply of the embodiment.

FIG. 8 is a timing chart showing the operations of each part in the switching power supply at <light load>. <Light load> is a region where the voltage of the error voltage signal VEAO outputted from the error amplifier 3 is lower than the reference voltage VR outputted from the reference voltage source 10.

In FIGS. 8 to 13, reference character VCC denotes an auxiliary power supply voltage. Reference character VD denotes the voltage of the DRAIN terminal which is the input terminal of the switching element 1. Reference character ID denotes a drain current (i.e., the voltage of the element current detection signal VCL). Reference character ID2 denotes current passing through the diode 130 on the secondary side. Reference character VTR denotes the voltage of the TR terminal. Reference character VEAO denotes the voltage of the error voltage signal. Reference character VR denotes the reference voltage of the reference voltage source 10. Reference character VC1 denotes the voltage of the capacitor 47 in the oscillator 6. Reference character set_1 denotes a clock signal (one-pulse signal) outputted by the oscillator 6. Reference character VC2 denotes the voltage of the capacitor 34 in the secondary duty limiter circuit 12. Reference character set_2 denotes a clock signal (one-pulse signal) outputted by the secondary duty limiter circuit 12. Reference character set denotes the set signal (output signal of the AND circuit 14) inputted to the set terminal of the flip-flop circuit 15. Reference character reset denotes the reset signal (output signal of the AND circuit 18) inputted to the reset terminal of the flip-flop circuit 15. Reference character VG denotes the voltage of the control terminal (gate terminal) of the switching element.

When the output signal IO passing through the load 132 is small, current passing through the secondary winding 110B is also reduced and the passage of the secondary current is shortened. Thus, the output signal (one-pulse signal) set_2 of the secondary duty limiter circuit 12 is outputted earlier than the output signal (one-pulse signal) set_1 of the oscillator 6. Hence, the output signal set_1 of the oscillator 6 is inputted to the set terminal of the flip-flop circuit 15 (set signal set).

When the output current IO passing through the load 132 decreases, the direct-current output voltage VO and the auxiliary power supply voltage VCC slightly increases. When the voltage of the error voltage signal VEAO decreases according to an increase in the auxiliary power supply voltage VCC, the drain current control circuit 5 controls the switching element 1 so as to reduce the drain current ID.

In this case, when the voltage of the error voltage signal VEAO is equal to the reference voltage VR1 which is lower between the reference voltages VR1 and VR2 set for the reference voltage source 10, the output signal of the comparator 9 in the light load intermittent oscillation control circuit 8 is at "L" level and is inputted to the AND circuit 14, and the set signal set to be inputted to the set terminal of the flip-flop circuit 15 is at "L" level. Therefore, the clock signal for determining the turn-on of the switching element 1 is not inputted to the set terminal of the flip-flop circuit 15 and the switching operation of the switching element 1 is stopped. At the same time, the reference voltage VR of the reference voltage source 10 is switched from the reference voltage VR1 to the reference voltage VR2 on the higher voltage side.

When the switching operation of the switching element 1 is stopped, energy supply through the transformer 110 is stopped, so that the direct-current output voltage VO and the auxiliary power supply voltage VCC gradually decrease. When the auxiliary power supply voltage VCC decreases, the voltage of the error voltage signal VEAO increases. Since the reference voltage VR of the reference voltage source 10 is equal to the reference voltage VR2 on the higher voltage side, the set signal set remains "L" level and the switching operation of the switching element 1 is not resumed immediately.

When the direct-current output voltage VO and the auxiliary power supply voltage VCC further decrease and the voltage of the error voltage signal VEAO reaches the reference voltage VR2, the output signal of the comparator 9 is at "H" level and is inputted to the AND circuit 14, and the switching operation of the switching element 1 is resumed in response to the output signal set_1 of the oscillator 6. At the same time, the reference voltage VR of the reference voltage source 10 is switched from the reference voltage VR2 to the reference voltage VR1 on the lower voltage side.

When the switching operation of the switching element 1 is resumed, the voltage of the error voltage signal VEAO is equal to the reference voltage VR2 and the drain current ID passing through the switching element 1 is larger than a current applied when the switching operation is stopped. Therefore, the direct-current output voltage VO and the auxiliary power supply voltage VCC increase and the voltage of the error voltage signal VEAO decreases. Then, when the voltage of the error voltage signal VEAO reaches the reference voltage VR1, the switching operation of the switching element 1 is stopped again.

In this way, when the output current IO passing through the load 132 is small, the switching operation of the switching element 1 becomes intermittent oscillation in which the operation is repeatedly stopped/resumed. The stop period and resume period of the switching operation depend upon the speeds of fluctuations in the direct-current output voltage VO and the auxiliary power supply voltage VCC. To be specific, as the output current IO to the load 132 decreases, the direct-current output voltage VO and the auxiliary power supply voltage VCC increase faster and decrease slower, thereby increasing the stop period of the switching operation of the switching element 1.

As described above, the operation of the switching power supply at <light load> is performed according to intermittent oscillation control system of repeatedly stopping/resuming the switching operation of the switching element 1. As the output current IO to the load 132 decreases, the stop period of the switching operation of the switching element 1 increases. Therefore, the switching power supply can reduce a loss caused by the switching operation of the switching element 1 at <light load>, thereby improving power consumption and efficiency. Further, the intermittent oscillation control can reduce an increase in the direct-current output voltage VO at <light load>.

During intermittent oscillation control, the oscillation frequency of the switching element 1 decreases. Hence, when an oscillation frequency enters an audio frequency band, the magnetostrictive sound of the transformer is normally heard. However, in the switching power supply, the peak current value of the drain current ID can be controlled at a low value according to a current value determined by the reference voltage VR1 and the reference voltage VR2 during intermittent oscillation, so that a magnetostrictive sound cannot be heard substantially. Therefore, according to the switching power supply, it is possible to sufficiently reduce the frequency of intermittent oscillation regardless of the influence of the magnetostrictive sound of the transformer, thereby considerably reducing power consumption during standby.

For example, by setting the reference voltage VR1 and the reference voltage VR2 of the reference voltage source 10 respectively at about 15% (more preferably at 15%) and about 20% (more preferably at 20%) of the overcurrent protection reference voltage VLIMIT, the peak current value of the drain current ID is sufficiently reduced during intermittent oscillation control, and the magnetostrictive sound of the transformer cannot be heard.

<(2) Constant Voltage Region 1>

FIG. 8 is a timing chart showing the operations of each part in <constant voltage region 1> of the switching power supply. <Constant voltage region 1> is a region where the voltage of the error voltage signal VEAO outputted from the error amplifier 3 is higher than the output voltage VR outputted from the reference voltage source 10 and lower than the overcurrent protection reference voltage VLIMIT.

When the output current IO passing through the load 132 is larger than a current at light load, the direct-current output voltage VO is slightly lower than a current at light load, and the voltage of the error voltage signal VEAO is higher than the reference voltage VR and lower than the overcurrent protection reference voltage VLIMIT, the output signal of the comparator 9 in the light load intermittent oscillation control circuit 8 is at "H" level and is inputted to the AND circuit 14.

In <constant voltage region 1>, the secondary current passing through the secondary winding 110B is small and the passage of the secondary current is shortened. Thus, the output signal set_2 of the secondary duty limiter circuit 12 is outputted earlier than the output signal set_1 of the oscillator 6. Hence, the output signal set_1 of the oscillator 6 is inputted to the set terminal of the flip-flop circuit 15 (set signal set).

Therefore, in <constant voltage region 1>, the clock signal set_1 from the oscillator 6 serves as the set signal set and the output signal of the drain current control circuit 5 serves as the reset signal reset. The output signal of the drain current control circuit 5 is outputted after a comparison is made between the voltage of the element current detection signal VCL outputted from the drain current detection circuit 4 and the voltage of the error voltage signal VEAO. The switching power supply goes out of the intermittent oscillation control and is operated according to the peak current control system with a fixed oscillation frequency.

<(3) Constant Voltage Region 2>

FIG. 10 is a timing chart showing the operations of each part in <constant voltage region 2> of the switching power supply. <Constant voltage region 2> is a region where the voltage of the error voltage signal VEAO outputted from the error amplifier 3 is higher than the overcurrent protection reference voltage VLIMIT.

When the output current IO passing through the load 132 is larger than that of <constant voltage region 1>, the direct-current output voltage VO is slightly lower than that of <constant voltage region 1>, and the voltage of the error voltage signal VEAO is higher than the overcurrent protection reference voltage VLIMIT, the drain current control circuit 5 compares the voltage of the element current detection signal VCL outputted from the drain current detection circuit 4 with the overcurrent protection reference voltage VLIMIT. Therefore, in the constant voltage region 2, the peak current value of the drain current ID passing through the switching element 1 is fixed at a current value determined by the overcurrent protection reference voltage VLIMIT.

In <constant voltage region 2>, although the secondary current passing through the secondary winding 110B reaches the maximum value, the on duty of the secondary current does not reach the predetermined value set by the secondary duty limiter circuit 12. Thus, the output signal set_2 of the secondary duty limiter circuit 12 is outputted earlier than the output signal set_1 of the oscillator 6. Hence, the output signal set_1 of the oscillator 6 is inputted to the set terminal of the flip-flop circuit 15 (set signal set).

The oscillation frequency regulating circuit 7 outputs, to the oscillator 6, a signal for increasing the oscillation frequency of the switching element 1 according to a difference between the voltage of the error voltage signal VEAO and the overcurrent protection reference voltage VLIMIT in the following state:

The voltage of the error voltage signal VEAO> the overcurrent protection reference voltage VLIMIT In this way, in <constant voltage region 2>, the clock signal set_1 serves as the set signal set and the output signal of the drain current control circuit S serves as the reset signal reset. The clock signal set_1 increases in oscillation frequency as the load increases. The output signal of the drain current control circuit 5 is outputted after a comparison is made between the voltage of the element current detection signal VCL and the overcurrent protection reference voltage VLIMIT. Thus, the switching power supply is operated according to the oscillation frequency control system with a fixed peak current.

When the output current IO passing through the load 132 increases, the oscillation frequency of the switching element 1 increases. While the output signal D2_on outputted from the secondary current off detection circuit 11 to the oscillator 6 is at "H" level, the subsequent one-pulse signal set_1 is not outputted from the oscillator 6. Thus, the subsequent turn-on pulse signal is generated after the application of the secondary current. In other words, the switching power supply operates in a discontinuous mode.

<(4) Borderline Region between the Constant Voltage Region 2 and the Constant Current Region>

Figure 11:
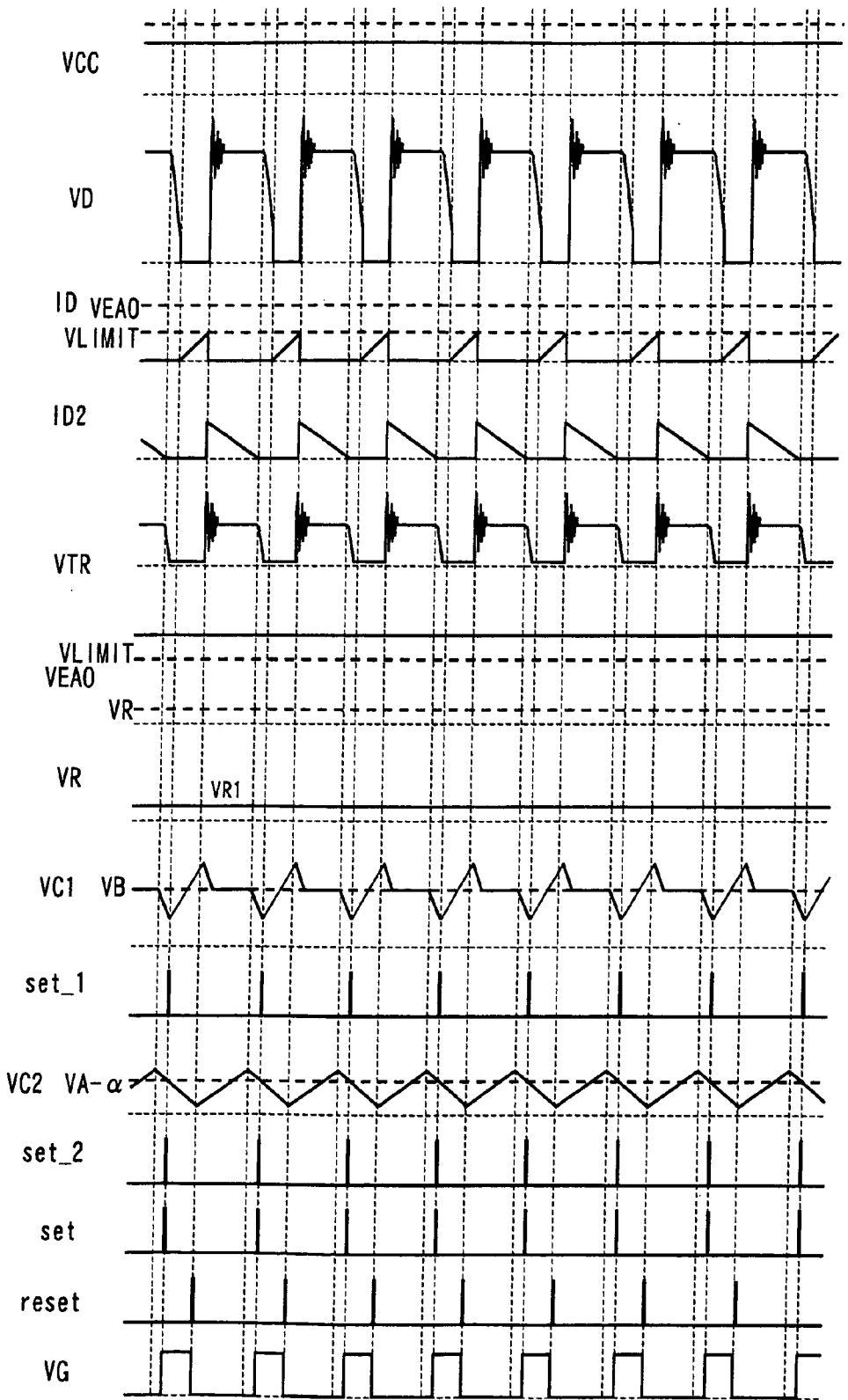
FIG. 11 is a timing chart showing operations of a borderline region of the constant voltage region 2 and a constant current region in the switching power supply of the embodiment.

FIG. 11 is a timing chart showing the operations of each part in the <borderline region between the constant voltage region 2 and the constant current region> of the switching power supply. The <borderline region between the constant voltage region 2 and the constant current region> is a region where the voltage of the error voltage signal VEAO outputted from the error amplifier 3 is higher than the overcurrent protection reference voltage VLIMIT and the first clock signal set_1 outputted from the oscillator 6 and the second clock signal set_2 outputted from the secondary duty limiter circuit 12 rise at the same time, that is, a region where the on duty of the secondary current reaches the set value.

In <constant voltage region 2>, the peak current value of the drain current ID passing through the switching element 1 is fixed at a current value determined by the overcurrent protection reference voltage VLIMIT, and the oscillation frequency regulating circuit 7 controls the oscillator 6 such that the oscillation frequency of the clock signal set_1 increases as the load becomes heavier. Therefore, in <constant voltage region 2>, when the output current IO passing through the load 132 increases, the oscillation frequency of the clock signal set_1 increases and the on duty of the secondary current also increases.

Then, when the on duty of the secondary current reaches the predetermined value set by the secondary duty limiter circuit 12, the output signal (one-pulse signal) set_2 of the secondary duty limiter circuit 12 and the output signal (one-pulse signal) set_1 of the oscillator 6 are outputted at the same time. Therefore, in the <borderline region between the constant voltage region 2 and the constant current region>, the on duty of the secondary current reaches the predetermined value set by the secondary duty limiter circuit 12.

Since the switching power supply operates in the discontinuous mode, energy supplied to the load 132 is expressed by the formula below:

$$VO \times IO = (½) \times Lp \times Ip \times Ip \times fosc \qquad (1)$$

where VO represents a direct-current output voltage, IO represents an output current, Lp represents the inductance of the primary winding 110A of the transformer 110, Ip represents the peak current value of the drain current ID, and fosc represents the oscillation frequency of the switching element 1.

In the <borderline region between the constant voltage region 2 and the constant current region>, the voltage of the error voltage signal VEAO is higher than the overcurrent protection reference voltage VLIMIT. Thus, the peak current value Ip of the drain current ID is fixed at a current value determined by the overcurrent protection reference voltage VLIMIT. To be specific, when the drain current ID reaches a current value determined by the overcurrent protection reference voltage VLIMIT, the switching element 1 is turned off. A current value when the switching element 1 is turned off and the secondary current starts passing through the secondary winding 110B, that is, the peak current value of the secondary current is a current value determined by a turns ratio of the primary winding 110A and the secondary winding 110B of the transformer 110, and thus the current value remains constant.

When the direct-current output voltage VO is constant, the inclination of the secondary current is also constant. Thus, the secondary current is always applied over a fixed period when the peak current value of the secondary current is constant. Therefore, in the <borderline region between the constant voltage region 2 and the constant current region>, the secondary current is always applied over a fixed period. Consequently, in the <borderline region between the constant voltage region 2 and the constant current region>, the oscillation frequency of the clock signal set_2 always has a constant value. In other words, in the <borderline region between the constant voltage region 2 and the constant current region>, the clock signal set_1 and the clock signal set_2 are equal in oscillation frequency. Thus, the oscillation frequency fosc of the switching element 1 always has a constant value.

When the inductance Lp of the primary winding 110A of the transformer 110 is changed, the inclination of the secondary current also changes. Thus, when the secondary current has a constant peak value, the inclination of the secondary current increases with the inductance Lp, so that the secondary current is applied over a longer period. Consequently, the clock signal set_2 decreases in oscillation frequency. In other words, in the <borderline region between the constant voltage region 2 and the constant current region>, the clock signal set_1 and the clock signal set_2 are equal in oscillation frequency. Thus, when the inductance Lp increases, the oscillation frequency fosc of the switching element 1 decreases. Conversely, when the inductance Lp decreases, the oscillation frequency fosc of the switching element 1 increases.

As is evident from the above explanation, in the <borderline region between the constant voltage region 2 and the constant current region>, a product of the inductance Lp of the primary winding 110A of the transformer 110 and the oscillation frequency fosc of the switching element 1 is constant. According to the formula (1), the output current IO is constant. Therefore, in the <borderline region between the constant voltage region 2 and the constant current region>, the output current IO is not affected by variations in the inductance value of the transformer and the oscillation frequency.

<(5) Constant Current Region>

Figure 12:
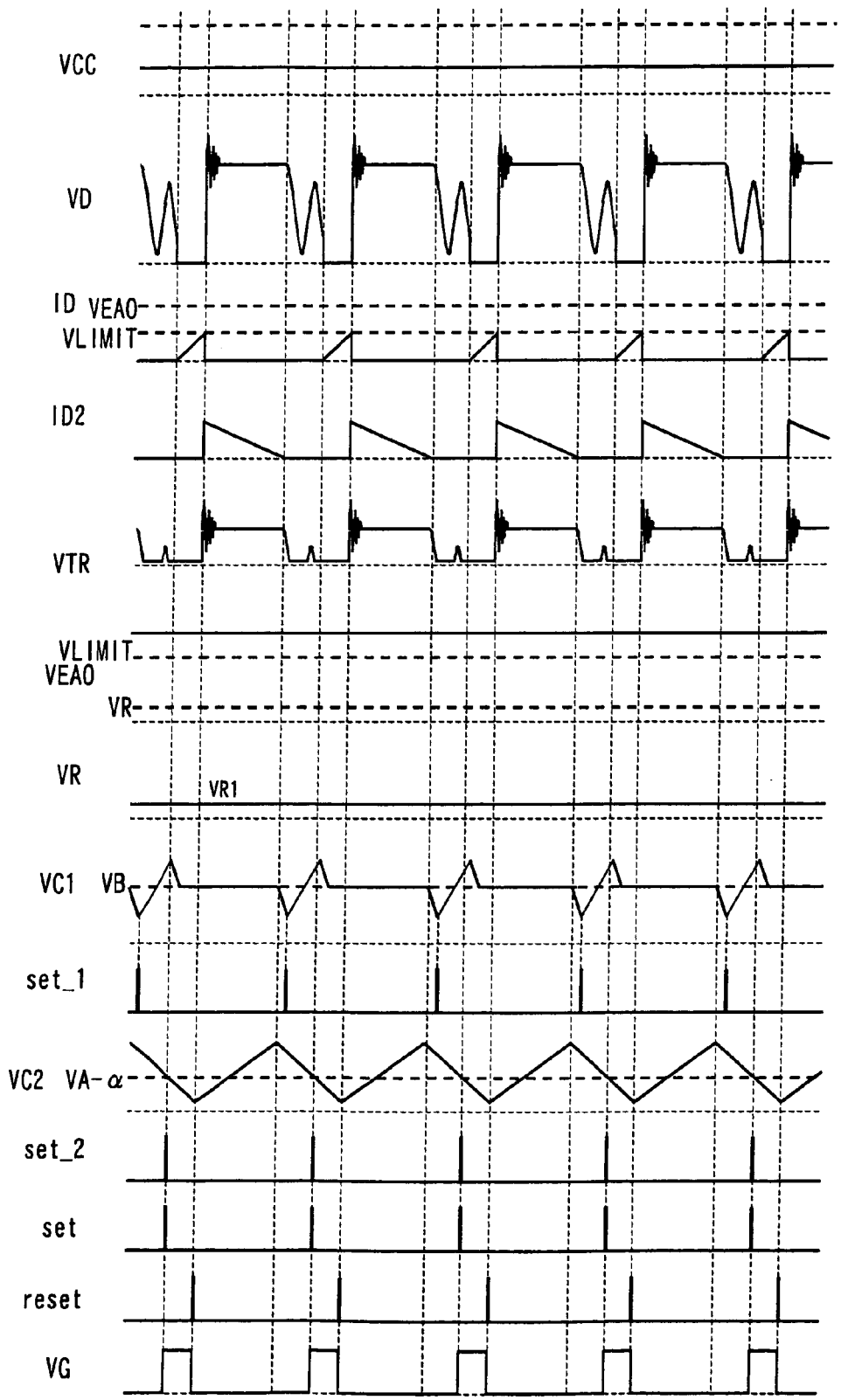
FIG. 12 is a timing chart showing operations of the constant current region in the switching power supply of the embodiment.

FIG. 12 is a timing chart showing the operations of each part in <constant current region> of the switching power supply. The <constant current region> is a region where the voltage of the error voltage signal VEAO outputted from the error amplifier 3 is higher than the overcurrent protection reference voltage VLIMIT and the switching operation of the switching element 1 is performed in response to the second clock signal set_2 outputted from the secondary duty limiter circuit 12.

When the load is increased such that the output current IO passing through the load 132 is larger than the output current IO passing through the <borderline region between the constant voltage region 2 and the constant current region>, as described above, the peak current value of the secondary current and the on duty of the secondary current are constant and the maximum energy is supplied to the secondary winding 110B, thereby reducing the direct-current output voltage VO.

When the direct-current output voltage VO decreases, the inclination of the secondary current is increased and the passage of the secondary current is lengthened. The output signal (one-pulse signal) set_2 is outputted from the secondary duty limiter circuit 12 after the output signal (one-pulse signal) set_1 from the oscillator 6. Hence, the output signal set_2 is outputted from the clock signal selector circuit 13.

The output signal set_2 is outputted such that the on duty of the secondary current is fixed at a predetermined value, so that the oscillation frequency of the switching element 1 decreases while the on duty of the secondary current is controlled at the predetermined value.

Therefore, as the load increases, the oscillation frequency of the switching element 1 decreases while the peak current value of the secondary current and the on duty of the secondary current remain constant.

When the on duty of the secondary current is equal to the predetermined value, the output current IO is expressed by the formula below:

$$IO = (½) \times I2p \times D2 \qquad (2)$$

where D2 represents the on duty of the secondary current and I2p represents the peak current value of the secondary current.

The peak current value I2p of the secondary current is constant because the peak current value of the drain current passing through the switching element 1 is controlled at a current value determined by the overcurrent protection reference voltage VLIMIT. Therefore, according to the switching power supply, it is possible to obtain the constant output current IO regardless of the inductance Lp of the primary winding 110A of the transformer 110 and the oscillation frequency fosc of the switching element 1, thereby achieving a constant current drooping characteristic with high accuracy and few variations.

<(6) Fold-Back Protection Region 1>

Figure 13:
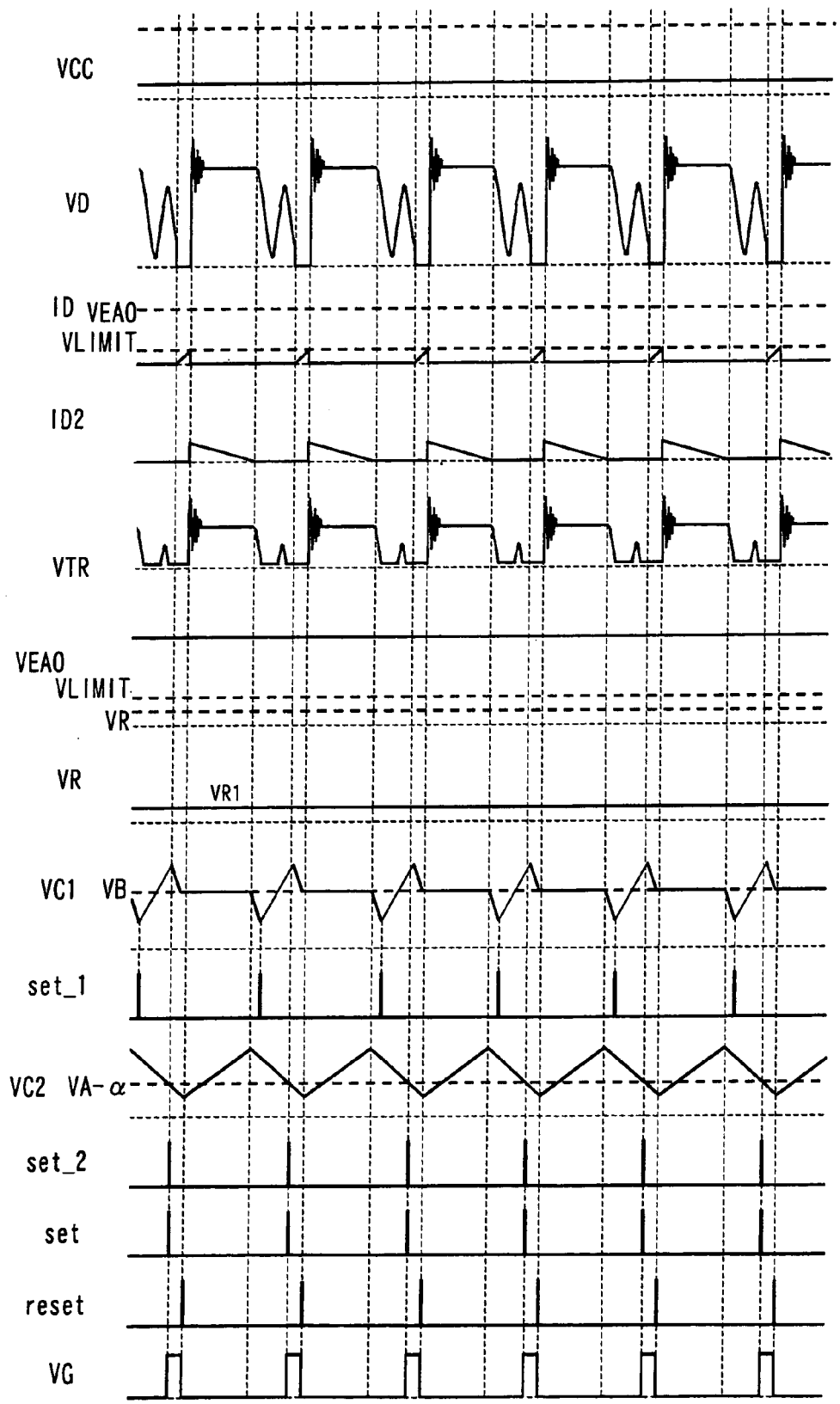
FIG. 13 is a timing chart showing operations of a fold-back protection region (at overload) in the switching power supply of the embodiment.

FIG. 13 is a timing chart showing the operations of each part in <fold-back protection region> of the switching power supply. The <fold-back protection region> is a region where the auxiliary power supply voltage VCC is lower than a voltage value set by the overcurrent protection reference voltage regulating circuit 16 in the <constant current region> and the overcurrent protection reference voltage VLIMIT is regulated by the overcurrent protection reference voltage regulating circuit 16.

In the <constant current region>, when the load 132 increases, the direct-current output voltage VO and the auxiliary power supply voltage VCC droop according to the load 132 while the output current IO remains constant. When the auxiliary power supply voltage VCC is lower than the voltage value set by the overcurrent protection reference voltage regulating circuit 16, the overcurrent protection reference voltage regulating circuit 16 reduces the overcurrent protection reference voltage VLIMIT according to a reduction in the auxiliary power supply voltage VCC.

The peak current value of the drain current ID passing through the switching element 1 and the peak current value of the secondary current passing through the secondary winding 110B decrease and thus the output current IO decreases according to formula (2). This operation reduces the output current IO when the direct-current output voltage VO decreases. Thus, it is possible to reduce the output current IO at overload such as a load short circuit, thereby achieving safe fold-back protection.

For example, the set value of the overcurrent protection reference voltage regulating circuit 16 is set at about 30% (about 30% of the stabilizing reference voltage, more preferable at 30%) of the auxiliary power supply voltage VCC stabilized in the <constant voltage region>. With this setting, the output current IO can be reduced after the direct-current output voltage VO sufficiently droops. Thus, it is possible to sufficiently reduce the output current IO at overload such as-a load short circuit while sufficiently obtaining a constant current drooping region for a charger.

For example, the overcurrent protection reference voltage regulating circuit 16 can regulate the overcurrent protection reference voltage VLIMIT at about 20% (more preferably at 20%) of the maximum value. With this configuration, the output current IO with a load short circuit is also set at about 20% of the output current IO in the constant current drooping region. Thus, it is possible to sufficiently reduce the output current IO at overload such as a load short circuit, thereby achieving safe fold-back protection.

When the direct-current output voltage VO decreases, the on duty of the secondary current is controlled at the predetermined value, thereby reducing the oscillation frequency of the switching element 1. Generally, when the oscillation frequency decreases to the audio frequency band, the magnetostrictive sound of the transformer is heard. However, in the switching power supply, when the direct-current output voltage VO and the oscillation frequency decrease, the peak current value of the drain current ID and the peak current value of the secondary current also decrease. Thus, it is possible to prevent the oscillation frequency from decreasing of entering the audio frequency band. Even in the audio frequency band, the peak values of the drain current ID and the secondary current are considerably reduced, so that a magnetostrictive sound cannot be heard substantially.

As described above, the present embodiment can eliminate a constant current control circuit, an output current detecting resistor, and a photocoupler on the secondary side, and achieve a constant current drooping characteristic which is sufficiently accurate with low cost, the minimum number of components, and the minimum power loss. Therefore, it is possible to constitute a sufficiently accurate switching power supply for a charger with a small number of components, and achieve low cost, miniaturization, and energy conservation for the switching power supply for a charger.

Further, in the constant current region, the peak current value of the drain current and the peak current value of the secondary current are made constant and the on duty of the secondary current is controlled at the predetermined value, thereby achieving a constant current drooping characteristic. Further, since variations in oscillation frequency or variations in the inductance of the transformer do not affect the constant current value of the output current, so that the overall variations are considerably reduced and a constant current drooping characteristic is obtained with high accuracy.

A light load has intermittent oscillation in which the peak current value of the drain current is reduced, and thus it is possible to reduce an increase in output voltage at light load, reduce power consumption, and achieve energy conservation during standby.

At overload, the peak value of the drain current is reduced according to a reduction in output voltage and the on duty of the secondary current is controlled at a predetermined value. Thus, it is possible to obtain a fold-back protection function, in which a lower output voltage has a lower output current, and constitute a safe power supply.

The switching element and the control circuit are disposed in the same semiconductor and thus simplification can be made easily. The main circuit components are formed in the single semiconductor, so that it is possible to reduce the number of components constituting the circuit and readily achieve miniaturization, light weight, and low cost for the power supply.

As described above, the switching power supply of the present embodiment can achieve a constant current drooping characteristic which is sufficiently accurate with low cost and the minimum number of components, and thus the switching power supply is useful for a charger for a portable device such as a mobile phone and a digital still camera.

What is claimed is:

1. A control method of switching a power supply circuit, comprising:
    switching input alternating voltage rectified and smoothed by a switching element and inputting the voltage to a primary winding of a voltage-converting transformer;
    rectifying and smoothing output alternating voltage generated on a secondary winding of the voltage-converting transformer to output direct-current voltage to a load; and
    switching said switching element by means of voltage generated on an auxiliary winding of said voltage-converting transformer, wherein
    an on duty of secondary current is kept at a predetermined value and a peak current value of the secondary current is kept at a fixed value when the on duty of the secondary current reaches the predetermined value, the secondary current starting flowing to the secondary winding after the switching element is turned off.

* * * * *